(12) United States Patent
Nation

(10) Patent No.: US 10,706,365 B2
(45) Date of Patent: Jul. 7, 2020

(54) LOCAL OPTIMIZATION OF QUANTUM CIRCUITS

(71) Applicant: International Business Machines Corporation, Armonk, NY (US)

(72) Inventor: Paul Nation, Mohegan Lake, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 16/144,593

(22) Filed: Sep. 27, 2018

(65) Prior Publication Data

US 2020/0104747 A1  Apr. 2, 2020

(51) Int. Cl.
| | | |
|---|---|---|
| *G06N 10/00* | (2019.01) | |
| *G06F 17/16* | (2006.01) | |
| *G06F 16/901* | (2019.01) | |
| *B82Y 10/00* | (2011.01) | |

(52) U.S. Cl.
CPC ......... *G06N 10/00* (2019.01); *G06F 16/9024* (2019.01); *G06F 17/16* (2013.01); *B82Y 10/00* (2013.01)

(58) Field of Classification Search
None
See application file for complete search history.

(56) References Cited

U.S. PATENT DOCUMENTS

| | | | |
|---|---|---|---|
| 8,175,995 B2 | 5/2012 | Amin | |
| 8,560,282 B2 | 10/2013 | Macready et al. | |
| 2005/0250651 A1 | 11/2005 | Amin et al. | |
| 2006/0123363 A1 | 6/2006 | Williams et al. | |
| 2009/0077001 A1 | 3/2009 | Macready et al. | |
| 2013/0318011 A1* | 11/2013 | Jones | G06F 11/07 706/12 |
| 2017/0286858 A1* | 10/2017 | La Cour | G06F 7/48 |
| 2018/0053112 A1 | 2/2018 | Bravyi et al. | |
| 2018/0137155 A1 | 5/2018 | Majumdar | |

FOREIGN PATENT DOCUMENTS

WO   2015123083 A2   8/2015

OTHER PUBLICATIONS

Siraichi, et al., Qubit allocation for quantum circuit compilers, Nov. 10, 2017, 15 Pages.

(Continued)

*Primary Examiner* — Michael D. Yaary

(74) *Attorney, Agent, or Firm* — Amin, Turocy & Watson, LLP

(57) ABSTRACT

Techniques facilitating local optimization of quantum circuits are provided. In one example, a computer-implemented method comprises applying, by a device operatively coupled to a processor, respective weights to matrix elements of a first matrix corresponding to a quantum circuit according to respective numbers of quantum gates between respective pairs of qubits in the quantum circuit; transforming, by the device, the first matrix into a second matrix based on the respective weights of the matrix elements; and permuting, by the device, respective qubits in the quantum circuit according to the second matrix, resulting in a permuted quantum circuit.

20 Claims, 20 Drawing Sheets

(56) References Cited

OTHER PUBLICATIONS

Saeedi, et al., Synthesis of Quantum Circuits for Linear Nearest Neighbor Architectures, Sep. 5, 2012, 14 Pages.

International Search Report and Written Opinion received in PCT Application No. PCT/EP2019/073745, dated Dec. 4, 2019, 12 pages.

Nation et al., "Iterative solutions to the steady-state density matrix for optomechanical System" Physical Review E (Statistical, Non Linear, and Soft Matter Physics, vol. 91, No. I, Nov. 17, 2014, 10 pages.

Nation P. D., "Steady-state solution methods for open quantum optical systems"arxiv.org, Cornell University Library, 201OLIN Library Cornell University, Apr. 26, 2015, 21 pages.

Guerreschi et al., "Two-step approach to scheduling quantum circuits" arxiv.org, Cornell University Library, 201OLIN Library Cornell University, Jul. 31, 2017, 25 pages.

\* cited by examiner

LOCAL OPTIMIZATION OF QUANTUM CIRCUITS

BACKGROUND

The subject disclosure relates to quantum computing, and more specifically, to quantum circuit design and optimization.

As computer technology advances and conventional computing devices decrease in physical scale, a growing interest has been placed on quantum computing as a technique by which computing technology can continue to advance past the physical limitations of traditional (classical) computers.

Quantum computing algorithms can be designed by first constructing a quantum circuit that includes respective quantum bits (qubits) and respective quantum gates that facilitate interaction between pairs of qubits, and subsequently mapping the constructed quantum circuit onto a quantum computing architecture. In order to execute quantum algorithms on current and near-term hardware, it is desirable to efficiently map quantum circuits onto quantum devices which may have limited local physical connectivity.

The efficiency of compiling a quantum algorithm onto a particular hardware architecture can be measured by, e.g., the gate count and depth of the compiled algorithm. As described in Williams et al., "METHOD AND APPARATUS FOR AUTOMATIC DESIGN OF QUANTUM CIRCUITS," U.S. Patent Application Publication No. 2006/0123363, the gate count of a quantum circuit can be reduced via "compactification techniques." Paragraph 83 of Williams et al. states the following:

> One embodiment applies deterministic circuit reduction operators to look for a pattern among sub-circuits and/or gates that can be eliminated or rewritten to a more compact gate. Another embodiment computes the circuit for a particular unitary matrix U and also computes the circuit for the inverse matrix of U. These two computed circuits are then examined to determine which is smaller and that circuit is used. Another embodiment is referred to as randomized compactification that uses a heuristic approach to arrive at a compact circuit.

In addition to optimizing the gate count associated with a quantum circuit, there exists a need in the art for techniques that can optimize a circuit for hardware with local interactions, e.g., that leaves the circuit substantially unmodified.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate local optimization of quantum circuits are described.

According to an embodiment, a system can include a memory that stores computer executable components and a processor that executes computer executable components stored in the memory. The computer executable components can include a matrix weighting component that applies respective weights to matrix elements of a first matrix corresponding to a quantum circuit according to respective numbers of quantum gates between respective pairs of qubits in the quantum circuit, a bandwidth reduction component that transforms the first matrix into a second matrix based on the respective weights of the matrix elements, and a permutation component that permutes respective qubits in the quantum circuit according to the second matrix, resulting in a permuted quantum circuit. The system according to this embodiment has the advantages of improved efficiency for quantum computing operations (in terms of, e.g., power consumption, processing cycles required, etc.) and improved ability to implement quantum circuits on quantum computer hardware, among other advantages.

In certain embodiments, the bandwidth reduction component can include a search component that generates an ordered list of qubits based on the respective weights of the respective matrix elements, and the bandwidth reduction component can transform the first matrix into the second matrix based on the ordered list of qubits. The system according to this embodiment has the advantage of improved quantum circuit optimization performance, among other advantages. In other embodiments, the search component can select, as a first qubit in the ordered list of qubits, a qubit in the quantum circuit having a first number of inter-qubit connections and a first combined matrix element weighting. The search component can further store qubits to the ordered list of qubits by increasing number of inter-qubit connections and decreasing combined matrix element weighting from the first number of inter-qubit connections and the first combined matrix element weighting, respectively. The system according to these embodiments has the advantage of further improved quantum circuit optimization performance, among other advantages. In further embodiments, the bandwidth reduction component can reverse the ordered list of qubits, resulting in a reversed ordered list of qubits, and transform the first matrix into the second matrix based on the reversed ordered list of qubits. Also or alternatively, the bandwidth reduction component can transform the first matrix into the second matrix via a breadth-first search. The system according to these embodiments has the advantage of improved optimization efficiency for various quantum circuit configurations, among other advantages. In still other embodiments, the system can include a SWAP mapping component that maps SWAP gates to respective qubits of the permuted quantum circuit. The system according to this embodiment has the advantage of reduced SWAP gates and/or associated physical connections in the associated quantum circuit, among other advantages. In yet other embodiments, the first matrix can have a first bandwidth, and the second matrix can have a second bandwidth that is less than the first bandwidth. The system according to this embodiment has the advantage of reduced quantum circuit complexity, e.g., approximately on the order of the difference between the first bandwidth and the second bandwidth, among other advantages.

According to another embodiment, a computer-implemented method can include applying, by a device operatively coupled to a processor, respective weights to matrix elements of a first matrix corresponding to a quantum circuit according to respective numbers of quantum gates between respective pairs of qubits in the quantum circuit; transforming, by the device, the first matrix into a second matrix based on the respective weights of the matrix elements; and permuting, by the device, respective qubits in the quantum circuit according to the second matrix, resulting in a permuted quantum circuit. The computer-implemented method according to this embodiment has the advantages of improved efficiency for quantum computing operations (in terms of, e.g., power consumption, processing cycles required, etc.) and improved ability to implement quantum circuits on quantum computer hardware, among other advantages.

In certain embodiments, the transforming can include generating an ordered list of qubits based on the respective weights of the respective matrix elements and transforming the first matrix into the second matrix based on the ordered list of qubits. The computer-implemented method according to this embodiment has the advantage of improved quantum circuit optimization performance, among other advantages. In other embodiments, the generating can include selecting, as a first qubit in the ordered list of qubits, a qubit in the quantum circuit having a first number of inter-qubit connections and a first combined matrix element weighting and storing qubits to the ordered list of qubits by increasing number of inter-qubit connections and decreasing combined matrix element weighting from the first number of inter-qubit connections and the first combined matrix element weighting, respectively. The computer-implemented method according to this embodiment has the advantage of further improved quantum circuit optimization performance, among other advantages. In still other embodiments, the transforming can include reversing the ordered list of qubits, resulting in a reversed ordered list of qubits, and transforming the first matrix into the second matrix based on the reversed ordered list of qubits. Also or alternatively, the generating can include transforming the first matrix into the second matrix via a breadth-first search. The system according to these embodiments has the advantage of improved optimization efficiency for various quantum circuit configurations, among other advantages.

According to a further embodiment, a computer program product for local optimization of a quantum circuit can include a computer readable storage medium having program instructions embodied therewith. The program instructions can be executable by a processing component to cause the processing component to apply respective weights to matrix elements of a first matrix corresponding to a quantum circuit according to respective numbers of quantum gates between respective pairs of qubits in the quantum circuit, transform the first matrix into a second matrix based on the respective weights of the matrix elements, and permute respective qubits in the quantum circuit according to the second matrix, resulting in a permuted quantum circuit. The computer program product according to this embodiment has the advantages of improved efficiency for quantum computing operations (in terms of, e.g., power consumption, processing cycles required, etc.) and improved ability to implement quantum circuits on quantum computer hardware, among other advantages.

In certain embodiments, the program instructions can cause the processor to generate an ordered list of qubits based on the respective weights of the respective matrix elements and transform the first matrix into the second matrix based on the ordered list of qubits. The computer program product according to this embodiment has the advantage of improved quantum circuit optimization performance, among other advantages. In other embodiments, the program instructions can cause the processor to transform the first matrix into the second matrix via a breadth-first search. The computer program product according to this embodiment has the advantage of improved optimization efficiency for various quantum circuit configurations, among other advantages.

According to an additional embodiment, a system can include a memory that stores computer executable components and a processor that executes computer executable components stored in the memory. The computer executable components can include a graph weighting component that applies respective weights to edges of a graph corresponding to a quantum circuit according to respective numbers of quantum gates between respective pairs of qubits in the quantum circuit, a graph modification component that repositions vertexes of the graph based on degrees of respective ones of the vertexes in the graph and the weights of respective ones of the edges in the graph, resulting in a modified graph, and a permutation component that permutes respective qubits in the quantum circuit according to the modified graph, resulting in a permuted quantum circuit. The system according to this embodiment has the advantages of improved efficiency for quantum computing operations (in terms of, e.g., power consumption, processing cycles required, etc.) and improved ability to implement quantum circuits on quantum computer hardware, among other advantages.

In certain embodiments, the graph modification component can include a search component that generates an ordered list of qubits based on the degrees of the respective ones of the vertexes of the graph and the weights of the respective ones of the edges of the graph, and the graph modification component can reposition the vertexes of the graph based on the ordered list of qubits. The system according to this embodiment has the advantage of improved quantum circuit optimization performance, among other advantages. In other embodiments, the search component can select, as a first qubit in the ordered list of qubits, a qubit corresponding to a vertex of the graph having a first degree and a first combined edge weight and store qubits to the ordered list of qubits by increasing degree and decreasing combined edge weight from the first degree and the first combined edge weight, respectively. The system according to this embodiment has the advantage of further improved quantum circuit optimization performance, among other advantages. In additional embodiments, the graph modification component can reverse the ordered list of qubits, resulting in a reversed ordered list of qubits, and reposition the vertexes of the graph based on the reversed ordered list of qubits. Also or alternatively, the graph modification component can reposition the vertexes of the graph via a breadth-first search. The system according to these embodiments has the advantage of improved optimization efficiency for various quantum circuit configurations, among other advantages.

According to yet another embodiment, a computer-implemented method can include applying, by a device operatively coupled to a processor, respective weights to edges of a graph corresponding to a quantum circuit according to respective numbers of quantum gates between respective pairs of qubits in the quantum circuit; repositioning, by the device, vertexes of the graph based on degrees of respective ones of the vertexes of the graph and the weights of respective ones of the edges of the graph, resulting in a modified graph; and permuting, by the device, respective qubits in the quantum circuit according to the modified graph, resulting in a permuted quantum circuit. The computer-implemented method according to this embodiment has the advantages of improved efficiency for quantum computing operations (in terms of, e.g., power consumption, processing cycles required, etc.) and improved ability to implement quantum circuits on quantum computer hardware, among other advantages.

In certain embodiments, the repositioning can include generating an ordered list of qubits based on the degrees of the respective ones of the vertexes of the graph and the weights of the respective ones of the edges of the graph and repositioning the vertexes of the graph based on the ordered list of qubits. The computer-implemented method according to this embodiment has the advantage of improved quantum circuit optimization performance, among other advantages. In other embodiments, the repositioning can include selecting, as a first qubit in the ordered list of qubits, a qubit corresponding to a vertex of the graph having a first degree and a first combined edge weight, and storing qubits to the ordered list of qubits by increasing degree and decreasing combined edge weight from the first degree and the first combined edge weight, respectively. The computer-implemented method according to this embodiment has the advantage of further improved quantum circuit optimization performance, among other advantages. In yet other embodiments, the repositioning can include repositioning the vertexes of the graph via a breadth-first search. The computer-implemented method according to these embodiments has the advantage of improved optimization efficiency for various quantum circuit configurations, among other advantages.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
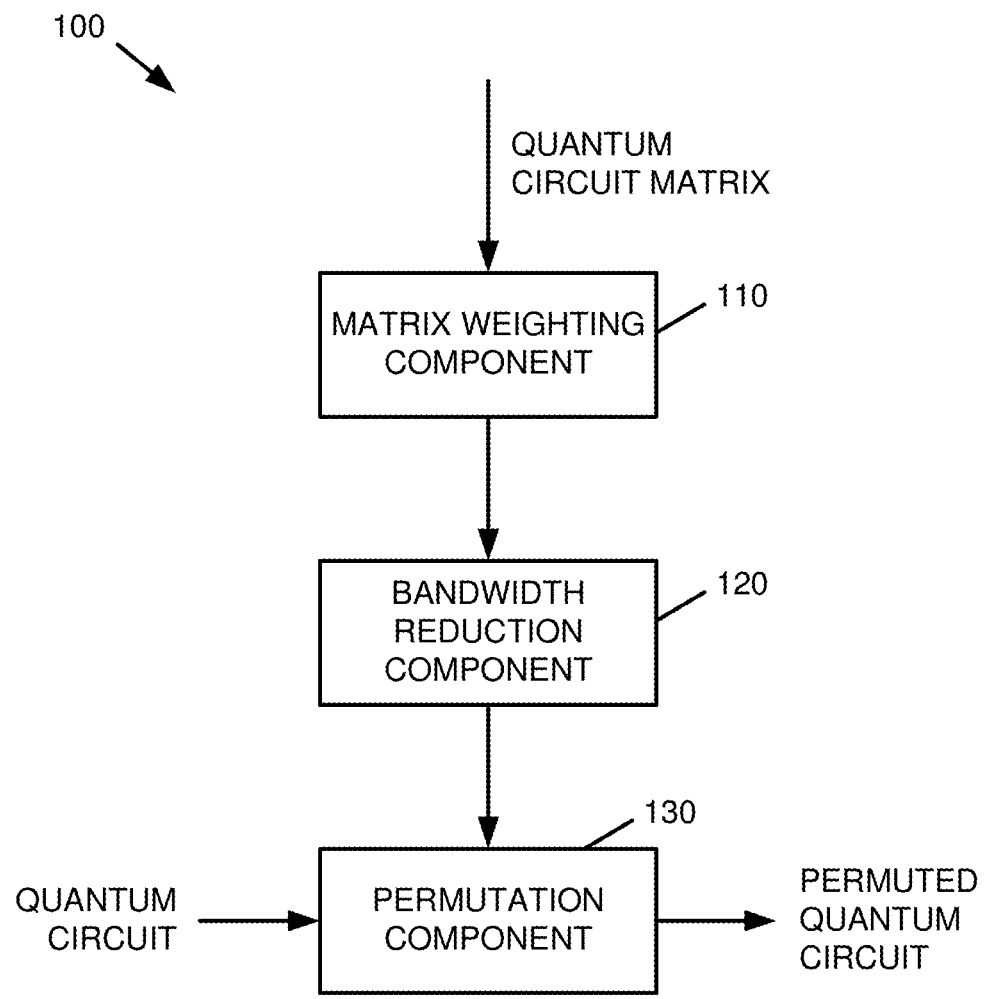
FIG. 1 is a block diagram of a system that facilitates local optimization of quantum circuits according to one or more embodiments described herein.

With reference now to the drawings, FIG. 1 illustrates a block diagram of a system 100 that facilitates local optimization of quantum circuits according to one or more embodiments described herein. As shown in FIG. 1, system 100 includes a matrix weighting component 110 that applies respective weights to matrix elements of a matrix (e.g., a first matrix) corresponding to a quantum circuit. In an aspect, the weights applied by the matrix weighting component 110 can correspond to respective numbers of quantum gates between respective pairs of qubits in the quantum circuit. Specific, non-limiting examples of matrices that can be processed by the matrix weighting component 110 are described in further detail below with respect to FIGS. 7, 8, 11, and 13.

In an aspect, a matrix corresponding to a given quantum circuit can be generated by the matrix weighting component 110 itself, or alternatively the matrix can be provided to the matrix weighting component 110 via one or more components that are external to system 100. The matrix can be, e.g., an n×n square sparse matrix, where n is the number of qubits in the quantum circuit. As noted above, the matrix weighting component 110 can weight respective elements of the matrix according to respective numbers of quantum gates between respective pairs of qubits in the underlying quantum circuit. The qubits of the quantum circuit can be indexed, and the matrix can be populated accordingly. By way of example for a matrix M, a matrix element $M_{i,j}$ can be populated with a value corresponding to a number of quantum gates between a first qubit having index i and a second qubit having index j. Qubits in the circuit that do not have quantum gates between each other can have corresponding values of 0, and/or other suitable null values, in the matrix.

As further shown by FIG. 1, system 100 includes a bandwidth reduction component 120 that can transform the matrix processed by the matrix weighting component 110 (e.g., the first matrix) into a second, different matrix based on the respective weights of the respective matrix elements as applied by the matrix weighting component 110. In an aspect, the second matrix as processed by the bandwidth reduction component 120 can have a bandwidth that is less than the bandwidth of the original matrix as processed by the matrix weighting component 110, thereby resulting in increased simplicity of the underlying quantum circuit, as described in more detail below.

System 100 in FIG. 1 further includes a permutation component 130 that can permute respective ones of the qubits in the underlying quantum circuit according to the second matrix as processed by the bandwidth reduction component 120, resulting in a permuted quantum circuit. In an aspect, the matrix weighting component 110, bandwidth reduction component 120, and permutation component 130 can collectively operate to improve quantum circuit efficiency on hardware with local connectivity by leveraging bandwidth and profile reduction in a corresponding sparse matrix. In doing so, system 100 addresses the problem of optimizing a quantum circuit for hardware with local interactions, resulting in solutions that can produce simpler and/or more efficient quantum circuits as compared to quantum circuits produced via conventional techniques. This can, in turn, increase speed of a quantum computer, reduce power usage of a quantum computer, reduce processing cycles and/or other computing resources utilized by a quantum computer, reduce time and/or processing cycles utilized for mapping a quantum circuit onto quantum hardware, etc. Other advantages of the embodiments provided herein can also be realized.

Figure 2:
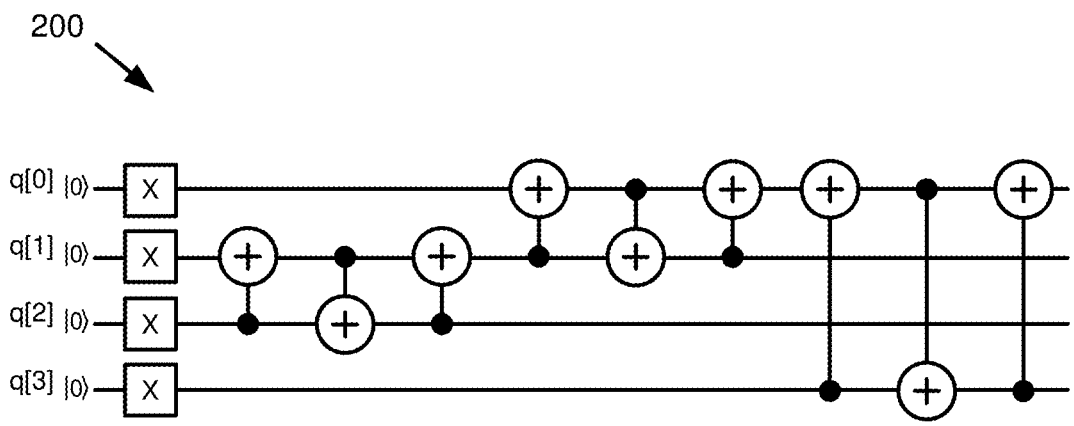
FIG. 2 is a diagram of an example quantum circuit prior to local optimization according to one or more embodiments described herein.
Figure 3:
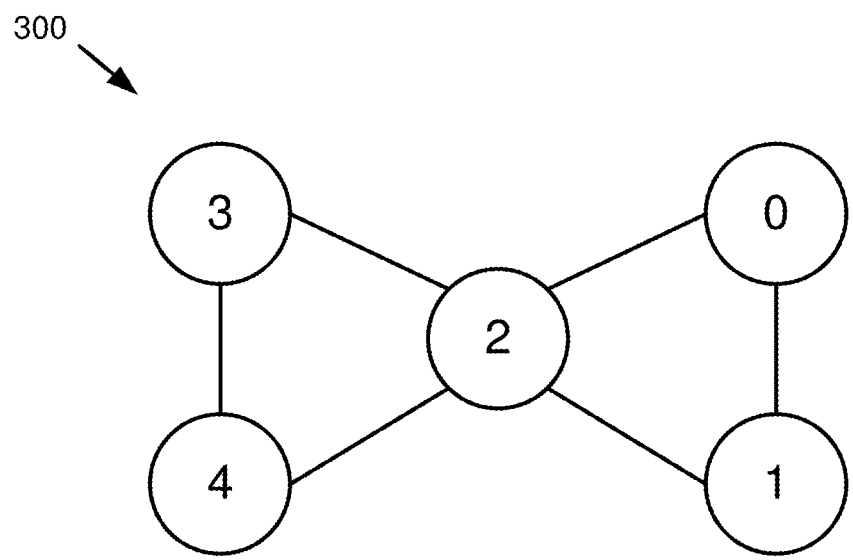
FIG. 3 is a diagram of an example qubit configuration prior to local optimization according to one or more embodiments described herein.
Figure 4:
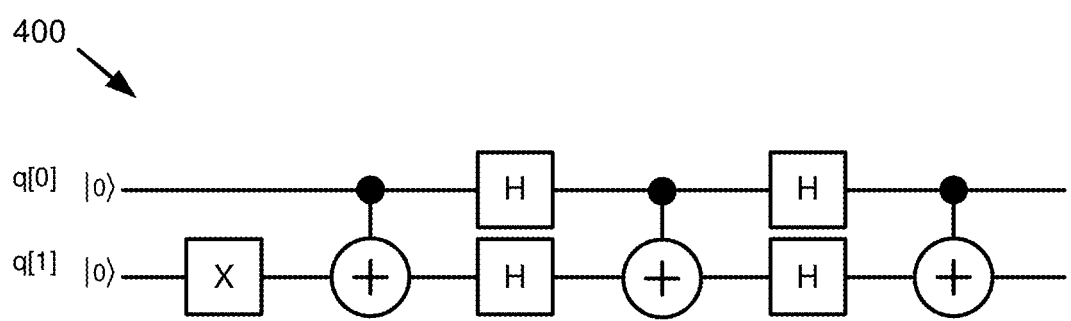
FIG. 4 is a diagram of an example quantum SWAP gate according to one or more embodiments described herein.

Turning to FIG. 2, diagram 200 depicts an example modulo multiplication quantum circuit $U_7$, which can be mapped to a 5-bit quantum hardware architecture as shown by diagram 300 in FIG. 3. As shown by diagram 200, the modulo multiplication circuit results in interactions via a series of controlled NOT (CNOT) gates between qubits 1 and 2, qubits 0 and 1, and qubits 0 and 3. However, because qubits 0 and 3 are not directly connected to each other in the hardware architecture as shown by diagram 300, a mapping of the quantum circuit shown by diagram 200 onto the architecture shown by diagram 300 would include extra SWAP gates, here between qubits 0 and 2 as well as between qubits 2 and 3, in order to mediate the CNOT gates between qubits 0 and 3. A quantum circuit diagram of an example SWAP gate between two qubits is shown by diagram 400 in FIG. 4.

Figure 5:
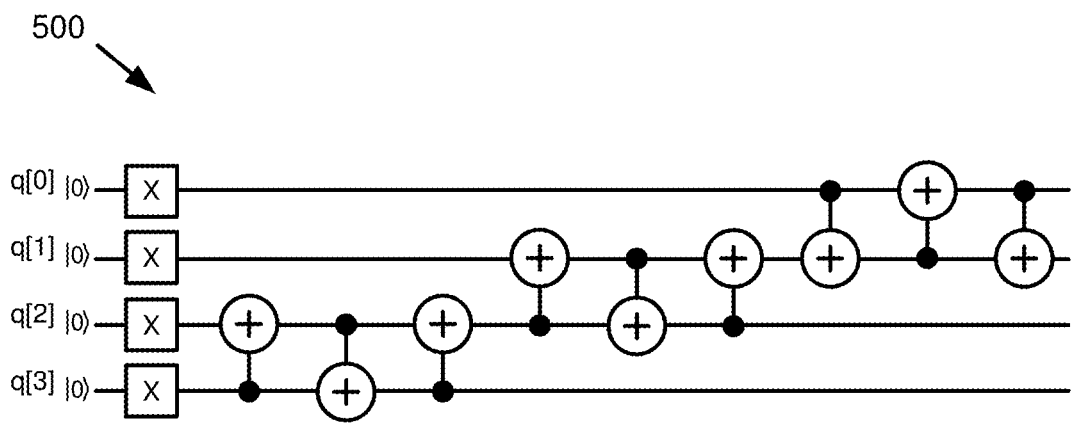
FIG. 5 is a diagram of the quantum circuit of FIG. 2 after local optimization according to one or more embodiments described herein.
Figure 6:
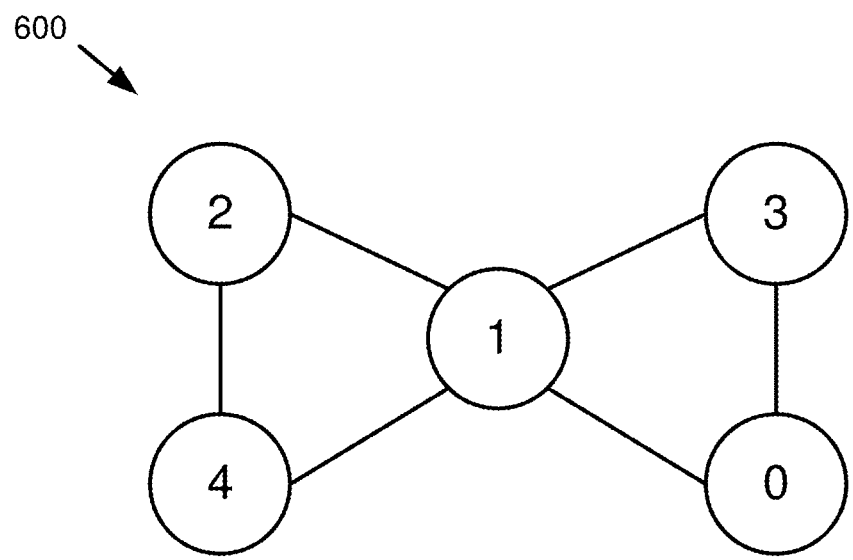
FIG. 6 is a diagram of the qubit configuration of FIG. 3 after local optimization according to one or more embodiments described herein.

In contrast, by utilizing one or more local optimization techniques as described herein, such as the techniques described above with respect to FIG. 1, the quantum circuit illustrated by diagram 200 can be permuted into the quantum circuit shown by 500 in FIG. 5 by relabeling and/or otherwise reassigning the respective qubits of the quantum circuit. The quantum circuit shown by diagram 500 can be mapped to a 5-bit quantum hardware architecture as shown by diagram 600 in FIG. 6. In an aspect, mapping the quantum circuit shown by diagram 500 onto quantum hardware in the manner shown by diagram 600, quantum gates can be established between only qubits of the hardware architecture that are directly connected to each other. This, in turn, can reduce the number of SWAP gates utilized by the quantum circuit while leaving the number of other quantum gates utilized by the quantum circuit unchanged.

Returning to FIG. 1, the matrix weighting component 110 and the bandwidth reduction component 120 can process respective two-qubit gates of a quantum circuit as a sparse matrix. In this manner, the bandwidth reduction component 120 can facilitate local optimization of the quantum circuit by reducing the bandwidth of its corresponding matrix.

Figure 7:
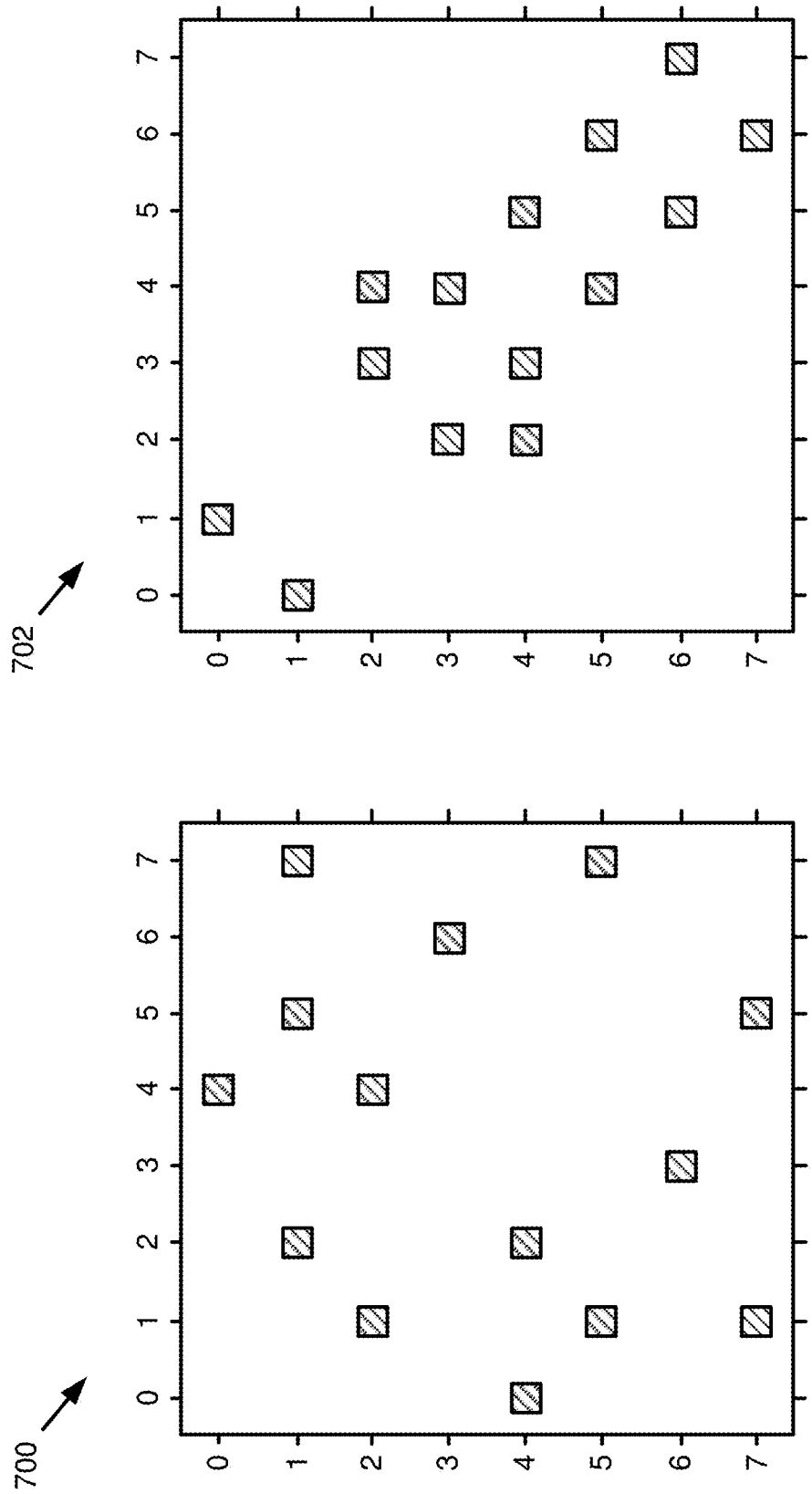
FIGS. 7-8 are diagrams of respective matrices associated with respective quantum circuits according to one or more embodiments described herein.

Diagrams 700 and 702 in FIG. 7 depict a sparse matrix corresponding to an example quantum circuit before and after optimization by the bandwidth reduction component 120, respectively. In an aspect, the sparse matrix can be denoted as $A_{ij}$, where the respective elements of matrix $A_{ij}$ can correspond to the number of two-qubit gates between qubits i and j in the corresponding circuit. In the matrix depicted by diagrams 700 and 702, elements $A_{ij}$ being associated with quantum gates are represented by squares, while elements not associated with quantum gates are left blank. As will be discussed further with respect to various examples that follow, respective matrix elements can also be given different (e.g., greater) weights based on differing numbers of quantum gates between corresponding qubit pairs.

In an aspect, the bandwidth reduction component 120 can initially process the matrix shown in diagram 700 by finding a permutation of rows and columns of the matrix that move non-zero elements of the matrix as close to the main diagonal as possible, thereby minimizing the bandwidth of the matrix. For instance, the matrix shown by diagram 700 prior to optimization has elements that are spatially scattered throughout the matrix, while the elements of the matrix shown by diagram 702 after optimization are substantially aligned to the main diagonal of the matrix, which can be visualized as a diagonal line (not shown) running from (0, 0) to (7, 7). In doing so, the resulting quantum circuit can prioritize connections between directly neighboring qubits (e.g., in a similar manner to the architectures shown by FIGS. 3 and 6), thereby reducing the number of SWAP gates associated with the circuit to facilitate a simplified circuit design on quantum hardware.

In an aspect, the bandwidth reduction component 120 can utilize any suitable algorithm or combination of algorithms for finding a permutation of rows and columns of a symmetric matrix that moves respective nonzero elements toward the main diagonal of the matrix. For instance, the bandwidth reduction component 120 can utilize algorithms similar to those used in reducing the memory footprint in sparse LU (lower-upper) decompositions and/or to increase stability of iLU (inverse LU) preconditioners.

By way of specific, non-limiting example, the bandwidth reduction component 120 can utilize a breadth-first search technique, such as Cuthill-McKee reordering, that starts at a node or vertex of lowest degree and sorts vertexes by increasing degree. In some instances, the resulting sorted vertices can be reversed (e.g., using a Reverse Cuthill-McKee sorting) to improve bandwidth reduction performance.

It should be appreciated, however, that the bandwidth reduction component 120 can utilize any suitable technique, or combination of techniques, to reduce the bandwidth of a quantum circuit matrix. Additionally, neither the description nor the claimed subject matter are intended to be limited to any specific algorithm(s) unless explicitly stated otherwise.

In another aspect, the weights applied by the matrix weighting component 110 and utilized by the bandwidth reduction component 120 can prioritize placing pairs of qubits associated with multiple quantum gates adjacent to one another, thereby further reducing the number of SWAP gates and/or other physical overhead associated with the corresponding quantum circuit. A graphical example of weighted matrix bandwidth reduction that can be performed by the bandwidth reduction component 120 is illustrated by diagrams 800 and 802 in FIG. 8. Here, the quantum circuit associated with the matrices shown by diagrams 800 and 802 is a five-qubit circuit that is physically configured such that each qubit in the circuit is connected via at least one quantum gate to each other qubit in the circuit. Thus, as shown by the matrices illustrated by diagrams 800 and 802, each element of the matrix, except for those directly on the main diagonal, is nonzero.

Figure 8:
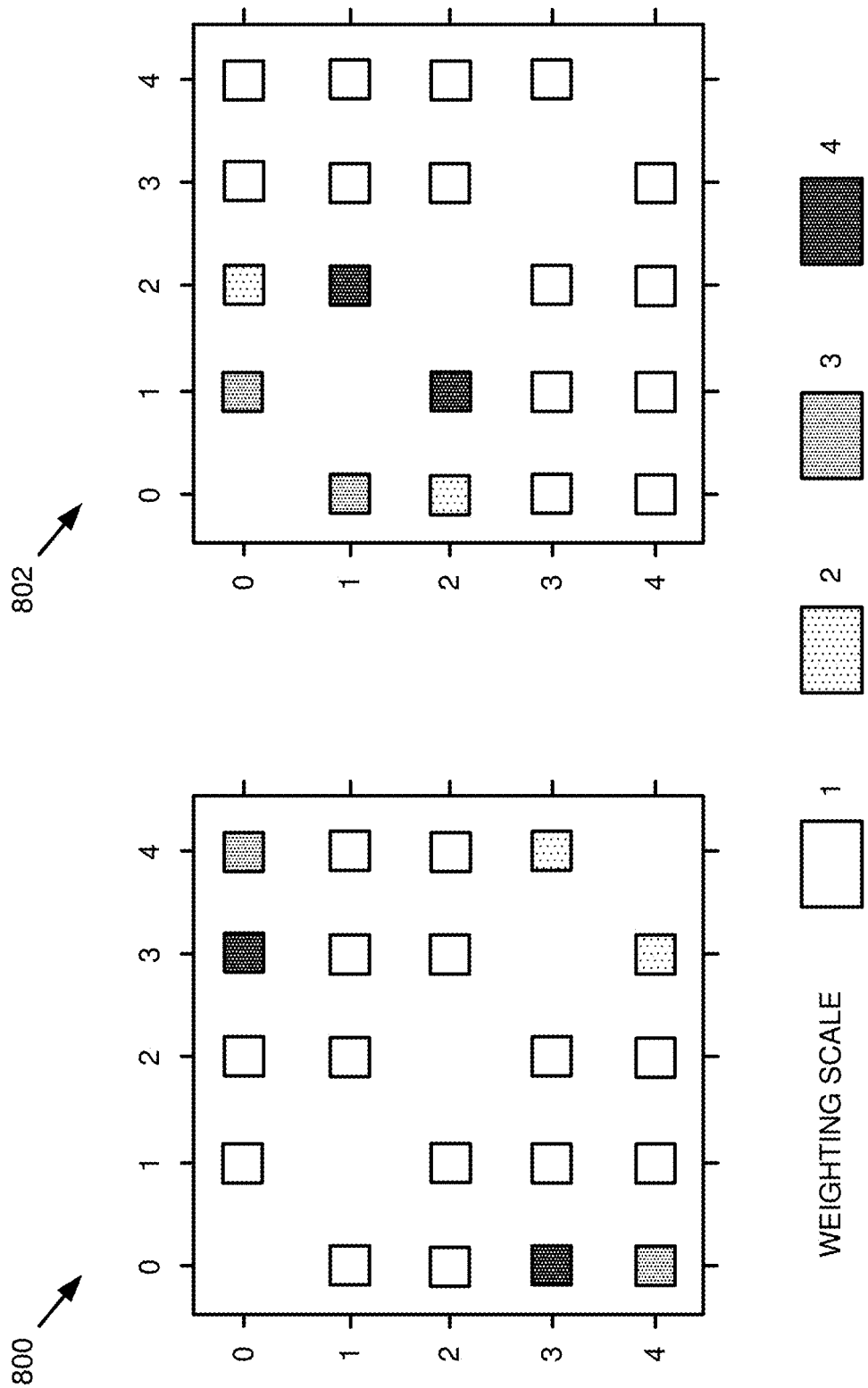

As further shown by FIG. 8, respective matrix elements can be assigned different weights, e.g., by the matrix weighting component 110, according to a weighting scale. Here, the weighting scale can correspond to the number of quantum gates corresponding to respective qubit pairs in the quantum circuit. Thus, for example, a matrix element with weight 1 can correspond to a qubit pair connected by one quantum gate, a matrix element with weight 2 can correspond to a qubit pair connected by two quantum gates, and so on.

Diagram 800 shows an example quantum circuit matrix prior to optimization by the bandwidth reduction component 120. Because canonical bandwidth minimization techniques operate upon the matrix structure only, such techniques would leave the matrix shown in diagram 800 unchanged since each element of the matrix other than those along the main diagonal is nonzero. In contrast, by utilizing element weights as shown by FIG. 8, the bandwidth reduction component 120 can facilitate additional local optimization by prioritizing repeated interactions between qubits. This, in turn, can increase the number of quantum gates that are shared between neighboring qubits in the quantum circuit, thereby reducing the SWAP count and/or other physical overhead associated with the circuit.

An example of the weighted quantum circuit matrix after optimization by the bandwidth reduction component 120 is shown by diagram 802. As diagram 802 illustrates, the bandwidth reduction component 120 can move the largest weight elements of the matrix towards the main diagonal, thereby rearranging the qubits in the corresponding quantum circuit to better accommodate repeated interactions between qubit pairs.

Figure 9:
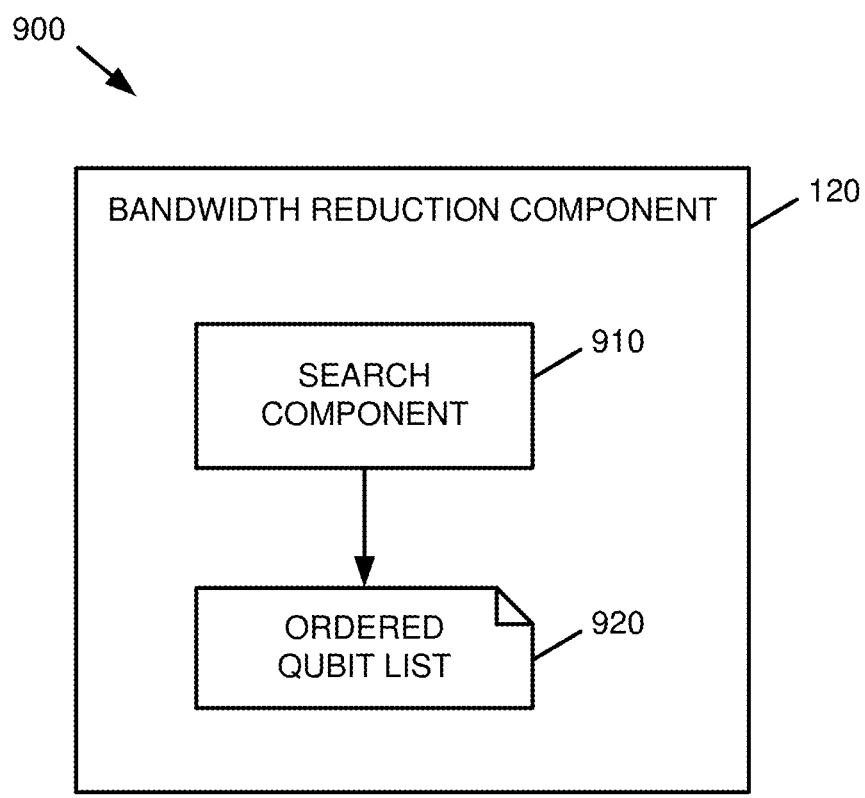
FIG. 9 is a block diagram of a system that facilitates optimization of a matrix corresponding to a quantum circuit according to one or more embodiments described herein.

Turning now to FIG. 9, a block diagram of a system 900 that facilitates optimization of a matrix corresponding to a quantum circuit according to one or more embodiments described herein is illustrated. Repetitive description of like elements employed in other embodiments described herein is omitted for sake of brevity. As shown in FIG. 9, system 900 includes a bandwidth reduction component 120 that can operate as described above with respect to FIG. 1. In an aspect, the bandwidth reduction component 120 can include a search component 910 that can generate an ordered list 920 of qubits based on the respective weights of the matrix elements, e.g., as assigned by the matrix weighting component 110. The bandwidth reduction component 120 can then transform the original (first) matrix processed by the matrix weighting component 110 into an optimized (second) matrix based on the ordered list 920 produced by the search component 910.

In an aspect, the search component 910 can begin generation of the ordered list 920 by selecting, as a first qubit in the ordered list 920, a qubit in the associated quantum circuit having a first number of inter-qubit connections and a first combined matrix element weighting. By way of non-limiting example, the search component 910 can select a qubit in the quantum circuit having a lowest number of inter-qubit connections (e.g., corresponding to a row of the matrix weighted by the matrix weighting component 110 having a lowest degree) and a lowest combined weighting. The search component 910 can then store qubits to the ordered list 920 by increasing number of inter-qubit connections and decreasing combined matrix element weighting from the first number of inter-qubit connections and the first combined matrix element weighting, respectively. Stated another way, with reference to the matrix weighted by the matrix weighting component, the search component 910 can begin traversal of the matrix with a qubit that has a lowest degree and lowest weight and add qubits to the ordered list 920 by a search traversal in which the qubits are sorted by lowest degree and highest weight, e.g., degree sorted from lowest to highest and weight sorted from highest to lowest.

In another aspect, the search component 910 can reverse a generated ordered list 920 to obtain a reversed ordered list. The bandwidth reduction component 120 can then utilize the reverse ordered list to transform the original quantum circuit matrix into an optimized matrix. By way of non-limiting example with respect to FIG. 7, the search component 910 can generate the ordered list [0, 4, 2, 1, 5, 7, 3, 6] based on the original matrix illustrated by diagram 700 using one or more search algorithms such as, e.g., a Cuthill-McKee search. The search component 910 can then reverse this list, e.g., to obtain [6, 3, 7, 5, 1, 2, 4, 0], which can be utilized by the bandwidth reduction component 120 to rearrange the elements of the matrix according to the reversed list in the order specified by the list. Thus, for instance, the bandwidth reduction component can reassign element 6 as shown in diagram 700 to element 0 as shown in diagram 702, element 3 as shown in diagram 700 to element 1 as shown in diagram 702, and so on until each element of the matrix has been reassigned. In a further aspect, the bandwidth reduction component 120 can utilize either the original ordered list 920 or the reversed ordered list, e.g., based on a determination of which ordered list better reduces the bandwidth of the matrix.

As noted above, the search component 910 can provide improved local quantum circuit optimization as compared to conventional techniques by incorporating matrix element weights, e.g., as applied by the matrix weighting component 110. For instance, as described above with respect to FIG. 8, the search component 910 can generate an ordered list 920 of qubits according to both degree and weighting, resulting in an optimized quantum circuit matrix as shown by diagram 802 that can improve circuit performance over that compared to techniques that operate on degree alone. In various examples, by utilizing weighted matrix traversal in the manner shown with respect to FIG. 8, the search component 910 can reduce the gate count and/or depth of quantum circuits by up to an order of magnitude.

In an aspect, the search component 910 can generate the ordered list 920 via one or more breadth-first search techniques, such as a weighted Cuthill-McKee search. It should be appreciated, however, that the search component 910 can utilize any suitable search algorithm or combination of algorithms to generate the ordered list 920 and/or transform an associated matrix.

Referring next to FIGS. 10-13, a specific, non-limiting example of quantum circuit optimization that can be performed according to various aspects described herein is illustrated. In particular, FIGS. 10-13 show respective circuit optimizations that can be performed for a quantum circuit for Simon's algorithm, which is utilized as an example here due to the knowledge of said algorithm in the art. It should be appreciated that other quantum circuits could be optimized in a similar manner.

Figure 10:
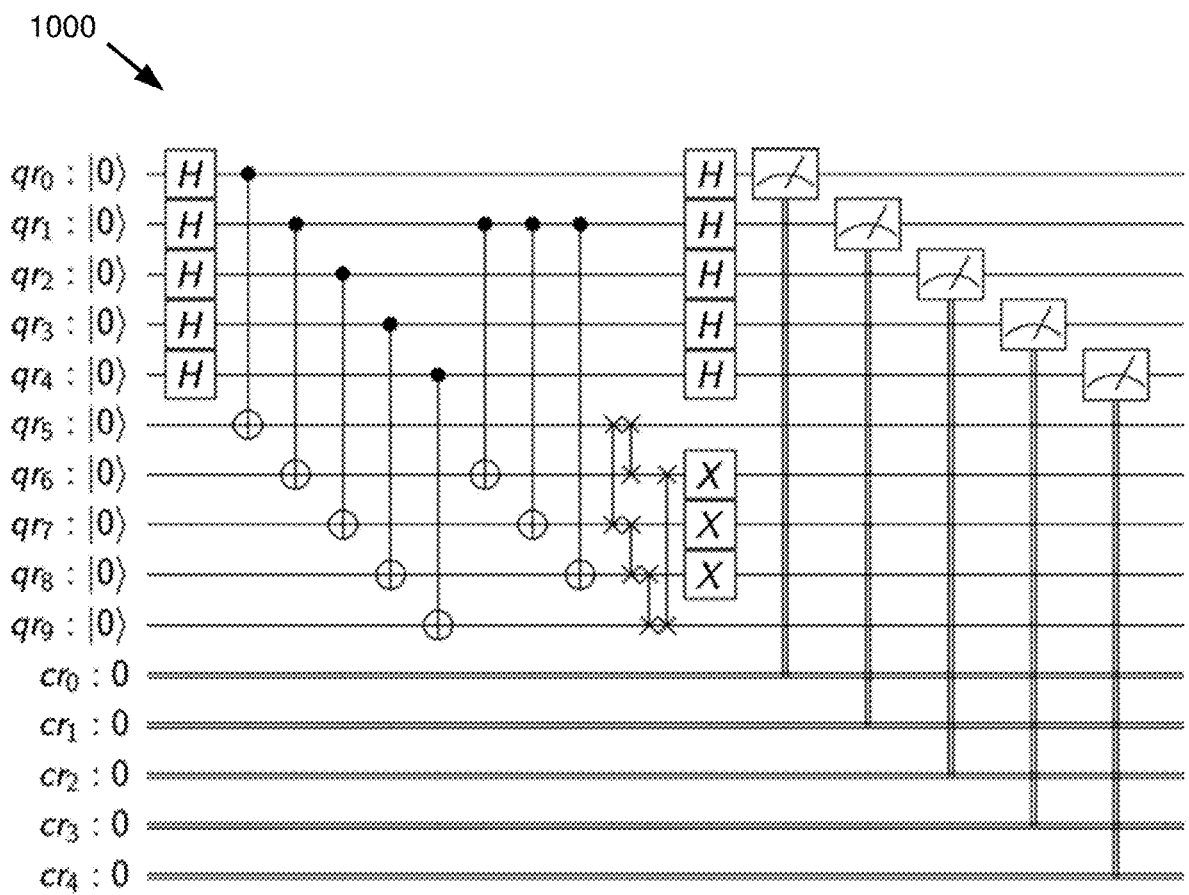
FIG. 10 is a diagram of an example quantum circuit prior to local optimization according to one or more embodiments described herein.
Figure 11:
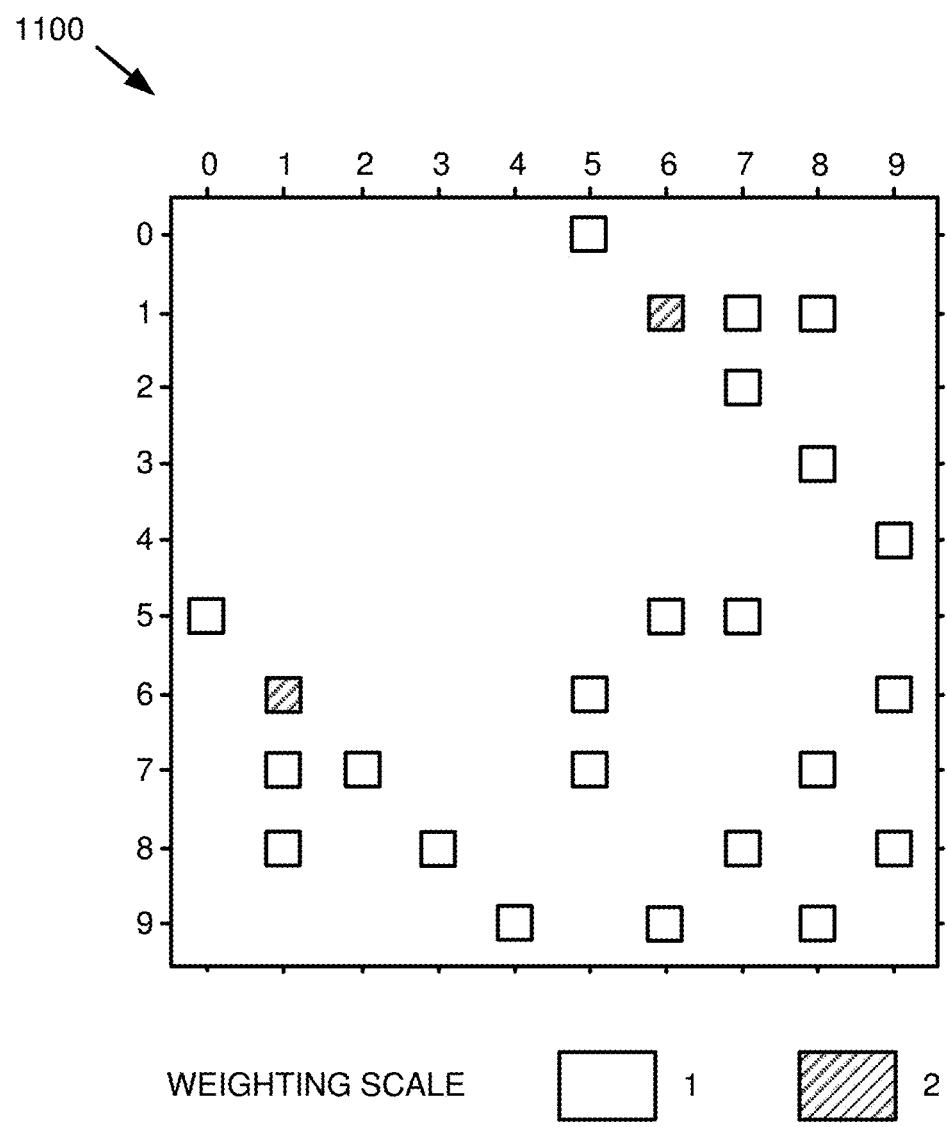
FIG. 11 is a diagram of a matrix associated with the quantum circuit of FIG. 10 according to one or more embodiments described herein.

Diagram 1000 in FIG. 10 illustrates a conventional quantum circuit for Simon's algorithm. Here, the circuit contains 26 quantum gates, with a gate depth of 14. The circuit shown by diagram 1000 is represented in matrix form by diagram 1100 in FIG. 11. As shown by diagram 1100, the matrix corresponding to the circuit shown by diagram 1000 has a bandwidth of 7 with a weighted profile (e.g., a measure of the extent to which higher-weighted elements in the matrix have been moved to the main diagonal) of 37.

Figure 12:
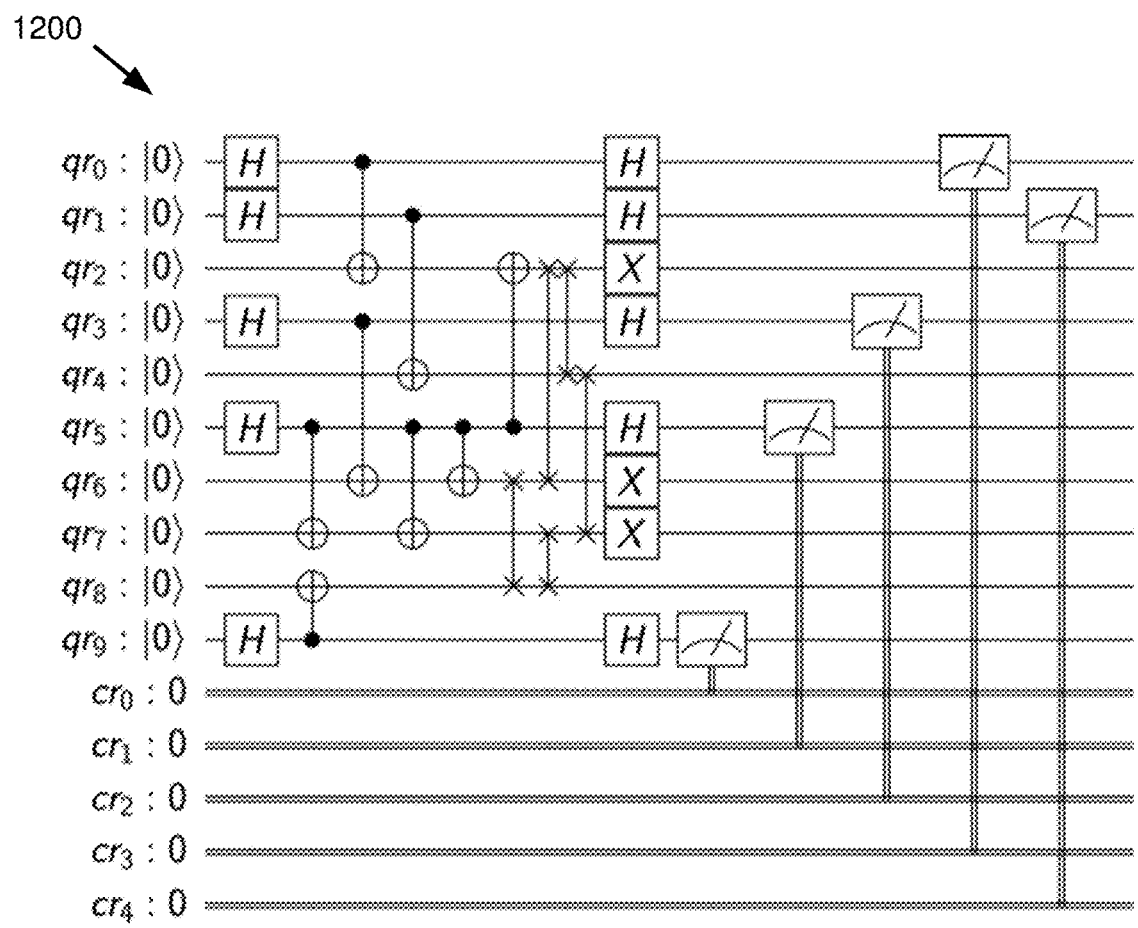
FIG. 12 is a diagram of the quantum circuit of FIG. 10 after local optimization according to one or more embodiments described herein.
Figure 13:
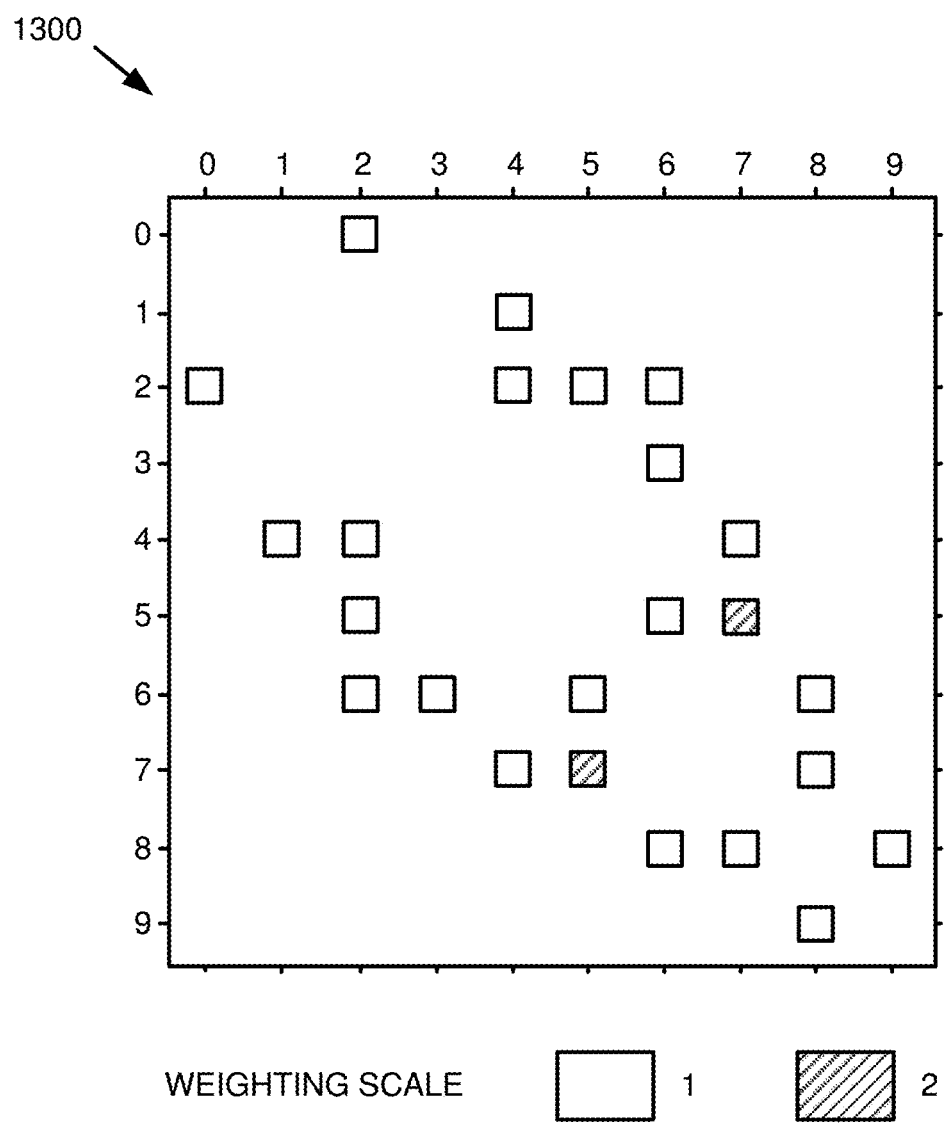
FIG. 13 is a diagram of a matrix associated with the quantum circuit of FIG. 12 according to one or more embodiments described herein.

In an aspect, by performing one or more circuit optimization techniques as described above, the quantum circuit shown by diagram 1000 in FIG. 10 can be transformed (e.g., by the permutation component 130) to the quantum circuit shown by diagram 1200 in FIG. 12. As a result of the operations described above, the circuit shown by diagram 1200 can still utilize 26 quantum gates, but the circuit depth can be reduced from 14 to 10. This can, in turn, significantly reduce the number of SWAP gates and/or other interconnections utilized for mapping the circuit shown by diagram 1200 onto quantum hardware. For instance, for one example quantum hardware implementation, the gate count (including SWAP gates and other similar gates) as mapped to the hardware can be reduced by a factor of approximately 33% as compared to the circuit shown by diagram 1000, and the circuit depth can similarly be reduced by a factor of approximately 42%. The circuit shown by diagram 1200 is represented in matrix form by diagram 1300 in FIG. 13. In comparison to the matrix shown by diagram 1100, the matrix bandwidth can be reduced from 7 to 4, and the weighted profile can be reduced from 37 to 23.

Figure 14:
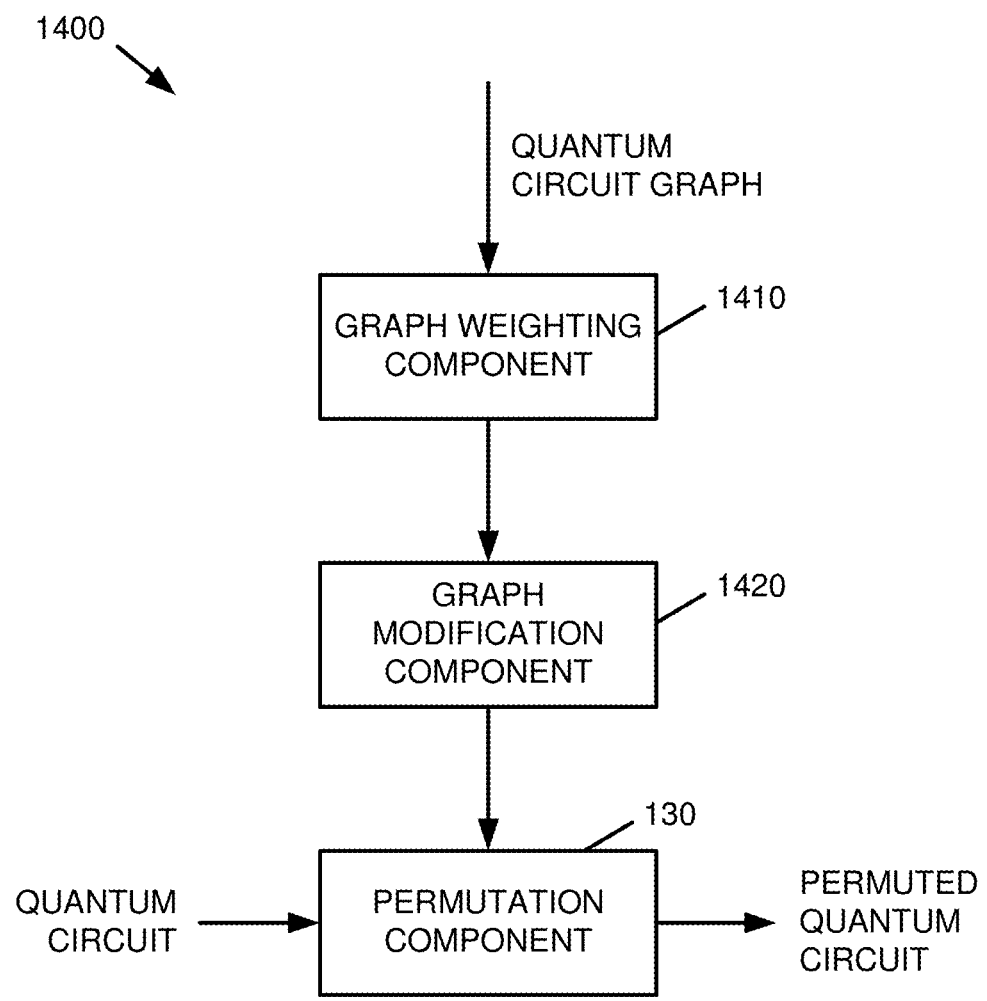
FIG. 14 is a block diagram of another system that facilitates local optimization of quantum circuits according to one or more embodiments described herein.

With reference next to FIG. 14, a block diagram of an alternative system 1400 that facilitates local optimization of quantum circuits according to various embodiments described herein is illustrated. Repetitive description of like elements employed in other embodiments described herein is omitted for sake of brevity. As shown in FIG. 14, system 1400 includes a graph weighting component 1410 that can apply respective weights to edges of a graph corresponding to a quantum circuit according to respective numbers of quantum gates between respective pairs of qubits in the quantum circuit.

In an aspect, a graph corresponding to a given quantum circuit can be generated by the graph weighting component 1410 itself, or alternatively the graph can be provided to the graph weighting component 1410 via one or more components that are external to system 1400. The graph can include, e.g., respective vertexes corresponding to qubits in the circuit and respective edges corresponding to quantum gates shared by respective pairs of qubits in the quantum circuit. In one example, the graph weighting component 1410 can weight respective edges of the graph according to respective numbers of quantum gates between respective pairs of qubits in the underlying quantum circuit. The qubits of the quantum circuit can be indexed, and the graph can be populated accordingly.

Figure 15:
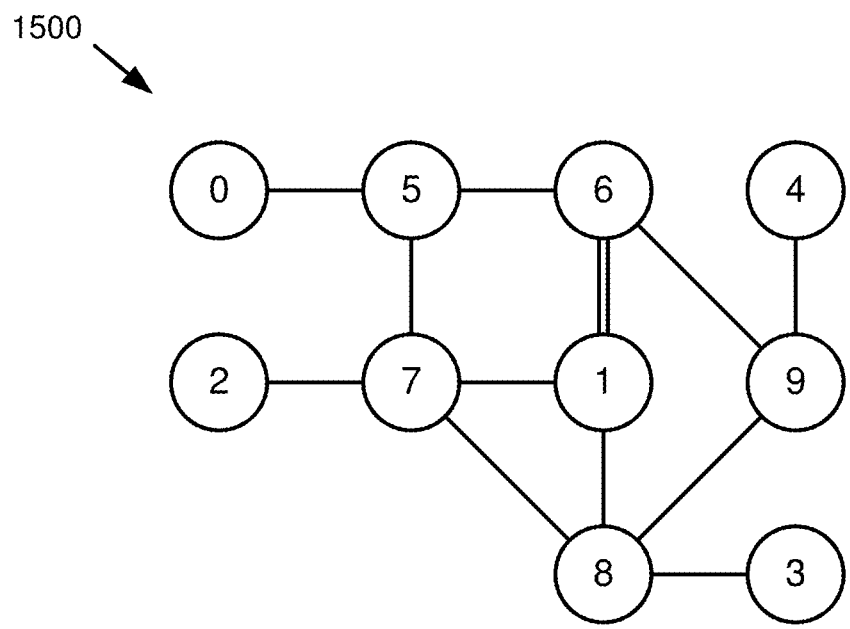
FIGS. 15-16 are diagrams of graphs associated with the quantum circuits of FIG. 10 and FIG. 12, respectively, according to one or more embodiments described herein.

In an aspect, techniques used by the graph weighting component 1410 for generating and/or weighting a graph corresponding to a quantum circuit can be similar to those utilized for generating and/or weighting elements of a matrix as described above with respect to the matrix weighting component 110. By way of specific, non-limiting example, diagram 1500 in FIG. 15 shows a graph representation of the quantum circuit for Simon's algorithm as shown by diagram 1000 in FIG. 10. As described above, the graph shown by diagram 1500 can include vertexes corresponding to respective qubits in the underlying quantum circuit and edges representing respective quantum gates in the circuit. As the qubits with indexes 1 and 6 in diagram 1000 are connected via two quantum gates, the edge between vertexes 1 and 6 in diagram 1500 can be given a weight of 2 by the graph weighting component 1410. This weighting is represented in diagram 1500 by a double line connecting vertexes 1 and 6. It should be appreciated, however, that this representation is merely for illustrative purposes, and weights can be applied to respective edges in the graph in any suitable manner.

Returning to FIG. 14, system 1400 further includes a graph modification component 1420 that can reposition vertexes within the graph generated and/or processed by the graph weighting component 1410, resulting in a modified graph. In an aspect, the graph modification component 1420 can reposition the vertexes in the graph based on degrees of respective vertexes in the graph (i.e., the number of vertexes that are connected via edges to a given vertex), the weights of respective edges in the graph, and/or other suitable factors. System 1400 as shown in FIG. 14 can further include a permutation component 130 that can permute respective ones of the qubits in the quantum circuit according to the modified graph in a similar manner to that described above with respect to FIG. 1 for a modified matrix. In an aspect, system 1400 addresses the problem of optimizing a quantum circuit for hardware with local interactions, resulting in solutions that can produce simpler and/or more efficient quantum circuits as compared to quantum circuits produced via conventional techniques.

Figure 16:
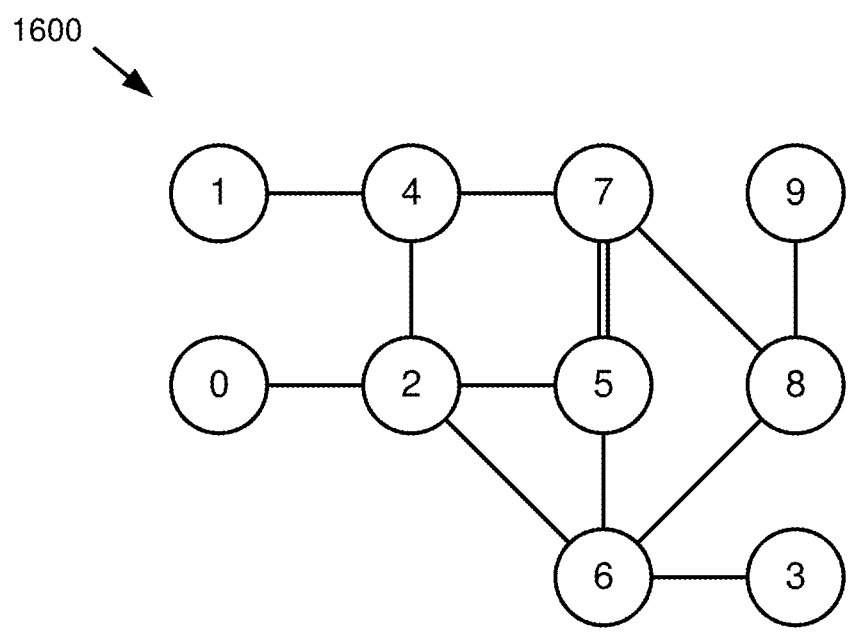

In an aspect, the graph modification component 1420 can reposition vertexes in the graph via one or more graph relabeling techniques. More particularly, the graph modification component 1420 can reposition the labels applied to respective vertexes in the graph, and by extension the corresponding qubits in the quantum circuit, while leaving the underlying physical structure of the graph otherwise unchanged. By way of non-limiting example, diagram 1600 in FIG. 16 shows the graph illustrated by diagram 1500 after processing by the graph modification component 1420. As shown by diagram 1600, the graph modification component 1420 can relabel the vertexes in the graph in order to optimize local connections associated with the underlying quantum circuit without making physical changes to the structure of the graph itself. In an aspect, the graph structure shown by diagram 1600 can result in a quantum circuit (e.g., via the permutation component 130) that is similar to that shown by diagram 1200 in FIG. 12.

Figure 17:
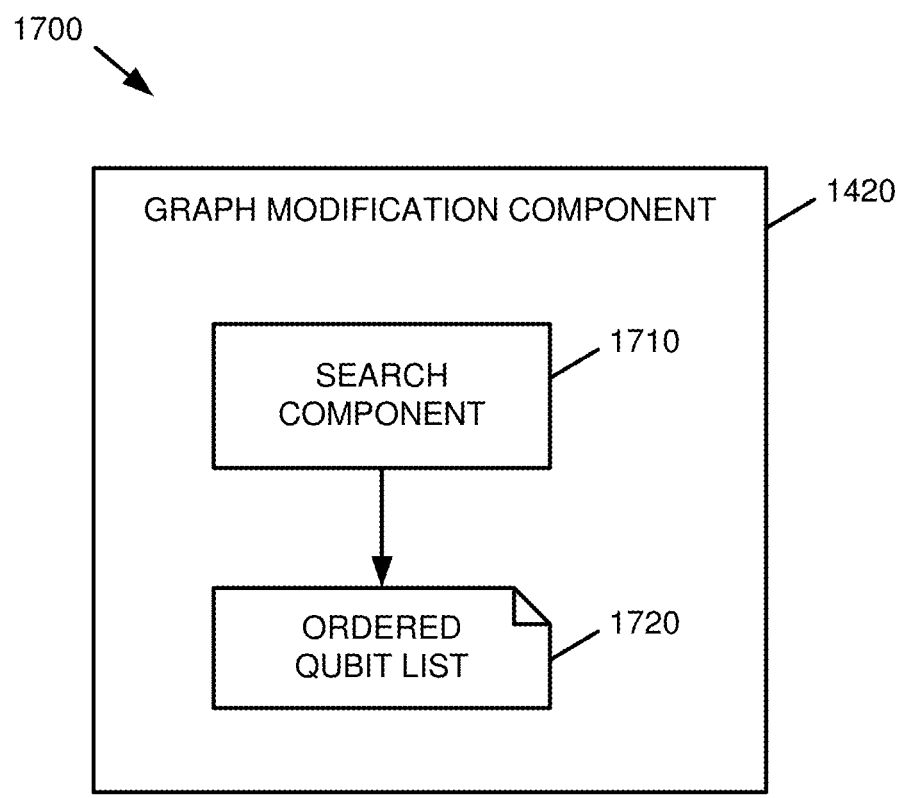
FIG. 17 is a block diagram of a system that facilitates optimization of a graph corresponding to a quantum circuit according to one or more embodiments described herein.

Turning now to FIG. 17, a block diagram of a system 1700 that facilitates optimization of a graph corresponding to a quantum circuit according to one or more embodiments described herein is illustrated. Repetitive description of like elements employed in other embodiments described herein is omitted for sake of brevity. As shown in FIG. 17, system 1700 includes a graph modification component 1420 that can operate as described above with respect to FIG. 14. In an aspect, the graph modification component 1420 can include a search component 1710 that can generate an ordered list 1720 of qubits based on the degrees of the respective vertexes in the graph and the respective weights applied to those vertexes, e.g., by the graph weighting component 1410. The graph modification component 1420 can then reposition the vertexes within the graph based on the ordered list 1720 produced by the search component 1710, e.g., by relabeling the vertexes in the graph in the manner shown by diagrams 1500 and 1600.

In an aspect, the search component 1710 can begin generation of the ordered list 1720 by selecting, as a first qubit in the ordered list 1720, a qubit corresponding to a vertex in the graph having a first degree and a first combined edge weight. By way of non-limiting example, the search component 1710 can select a qubit in the quantum circuit corresponding to a vertex in the graph having a lowest degree (and, by extension, a lowest number of inter-qubit connections) and a lowest total edge weight associated with the edges connected to that vertex. The search component 1710 can then store qubits to the ordered list 1720 by increasing degree and decreasing combined edge weight from the first degree and the first combined edge weight, respectively. In another aspect, the search component 1710 can reverse a generated ordered list 1720 to obtain a reversed ordered list. Subsequently, the graph modification component 1420 can utilize the reverse ordered list to relabel or reposition the respective nodes of the quantum circuit graph.

As noted above, the search component 1710 can provide improved local quantum circuit optimization as compared to conventional techniques by incorporating graph edge weights, e.g., as applied by the graph weighting component 1410. For instance, as described above with respect to FIGS. 15-16, the search component 1710 can generate an ordered list 1720 of qubits according to both degree and weighting, resulting in an optimized quantum circuit graph as shown by diagram 1600 that can improve circuit performance over that compared to techniques that operate on degree alone. In various examples, by utilizing weighted graph traversal in the manner shown with respect to FIGS. 15-16, the search component 1710 can reduce the gate count and/or depth of quantum circuits by up to an order of magnitude.

In an aspect, the search component 1710 can generate the ordered list 1720 via one or more techniques that can be similar to the techniques utilized by the search component 910 described above with respect to FIG. 9. These techniques can include breadth-first search techniques, such as a weighted Cuthill-McKee search. As with the search component 910, however, it should be appreciated that the search component 1710 can utilize any suitable search algorithm or combination of algorithms to generate the ordered list 1720 and/or transform an associated graph.

Figure 18:
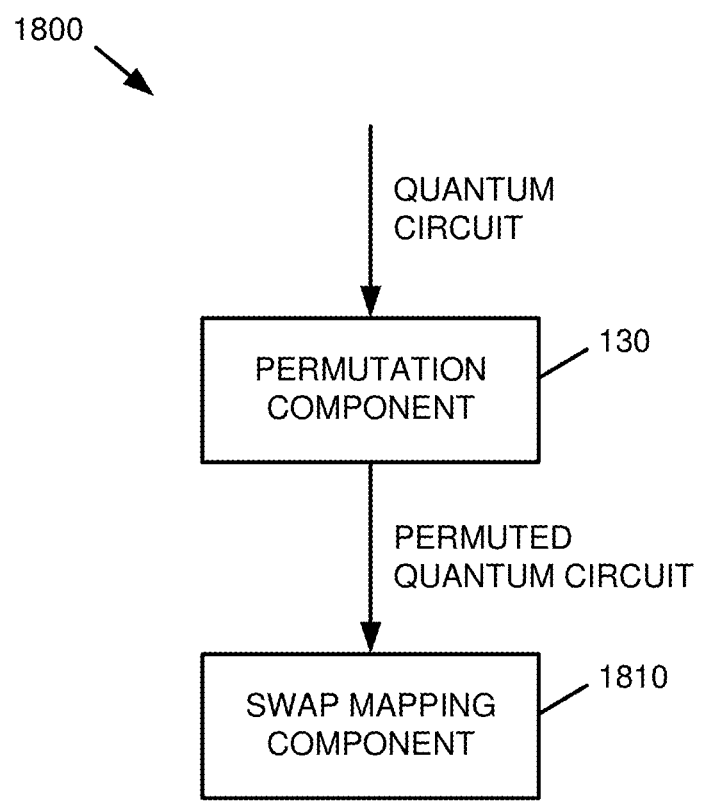
FIG. 18 is a block diagram of a system that facilitates mapping SWAP gates of a locally optimized quantum circuit according to one or more embodiments described herein.

With reference now to FIG. 18, a block diagram of a system 1800 that facilitates mapping SWAP gates of a locally optimized quantum circuit according to one or more embodiments described herein is illustrated. Repetitive description of like elements employed in other embodiments described herein is omitted for sake of brevity. System 1800 as shown in FIG. 18 includes a SWAP mapping component 1810, which can map SWAP gates to respective qubits of a permuted quantum circuit, e.g., as processed by the permutation component 130 according to the description provided above with respect to FIG. 1 and/or FIG. 14. In an aspect, the SWAP mapping component 1810 can be utilized to facilitate mapping the permuted quantum circuit generated by the permutation component 130 to quantum hardware directly, or alternatively one or more transpiler components and/or other processing steps can be inserted between the permutation component 130 and the SWAP mapping component 1810. As noted above, the permutation component 130 can utilize various techniques as described herein to produce a quantum circuit with improved local connectivity. As such, the number of SWAP gates utilized by the SWAP mapping component 1810 as used in system 1800 can be lower than that associated with conventional quantum circuits. Other advantages can also be realized.

Figure 19:
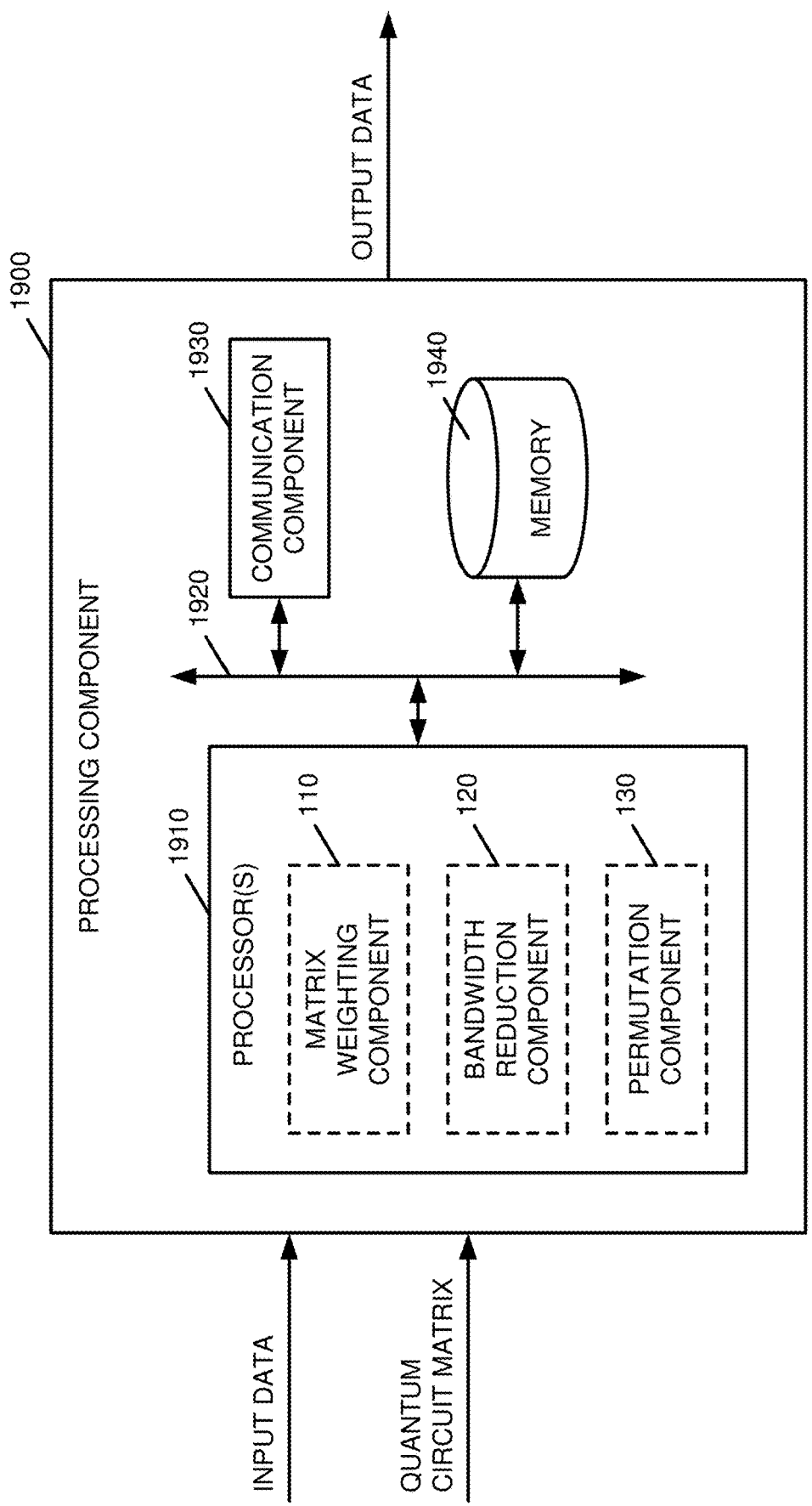
FIGS. 19-20 are diagrams of respective example, non-limiting processing components according to one or more embodiments described herein.

Referring next to FIG. 19, a processing component 1900 that can be utilized to implement one or more aspects described herein is illustrated in accordance with one or more embodiments is illustrated. Repetitive description of like elements employed in other embodiments described herein is omitted for sake of brevity.

As shown in FIG. 19, the processing component 1900 can be associated with at least one processor 1910 (e.g., a central processing unit, a graphical processing unit, etc.), which can be utilized to implement one or more of the matrix weighting component 110, bandwidth reduction component 120, and/or permutation component 130 as described above. The processor(s) 1910 can be connected via a data bus 1920 to one or more additional sub-components of the processing component 1900, such as a communication component 1930 and/or a memory 1940. While the communication component 1930 is illustrated as implemented separately from the processor(s) 1910, the processor(s) 1910 in some embodiments can additionally be used to implement the communication component 1930. In still other embodiments, the communication component 1930 can be external to the processing component 1900 and communicate with the processing component 1900 via a separate communication link.

The memory 1940 can be utilized by the processing component 1900 to store data utilized by the processing component 1900 in accordance with one or more embodiments described herein. Additionally or alternatively, the memory 1940 can have stored thereon machine-readable instructions that, when executed by the processing component 1900, cause the processing component 1900 (and/or one or more processors 1910 thereof) to implement the matrix weighting component 110, bandwidth reduction component 120, and/or permutation component 130 as described above.

Figure 20:
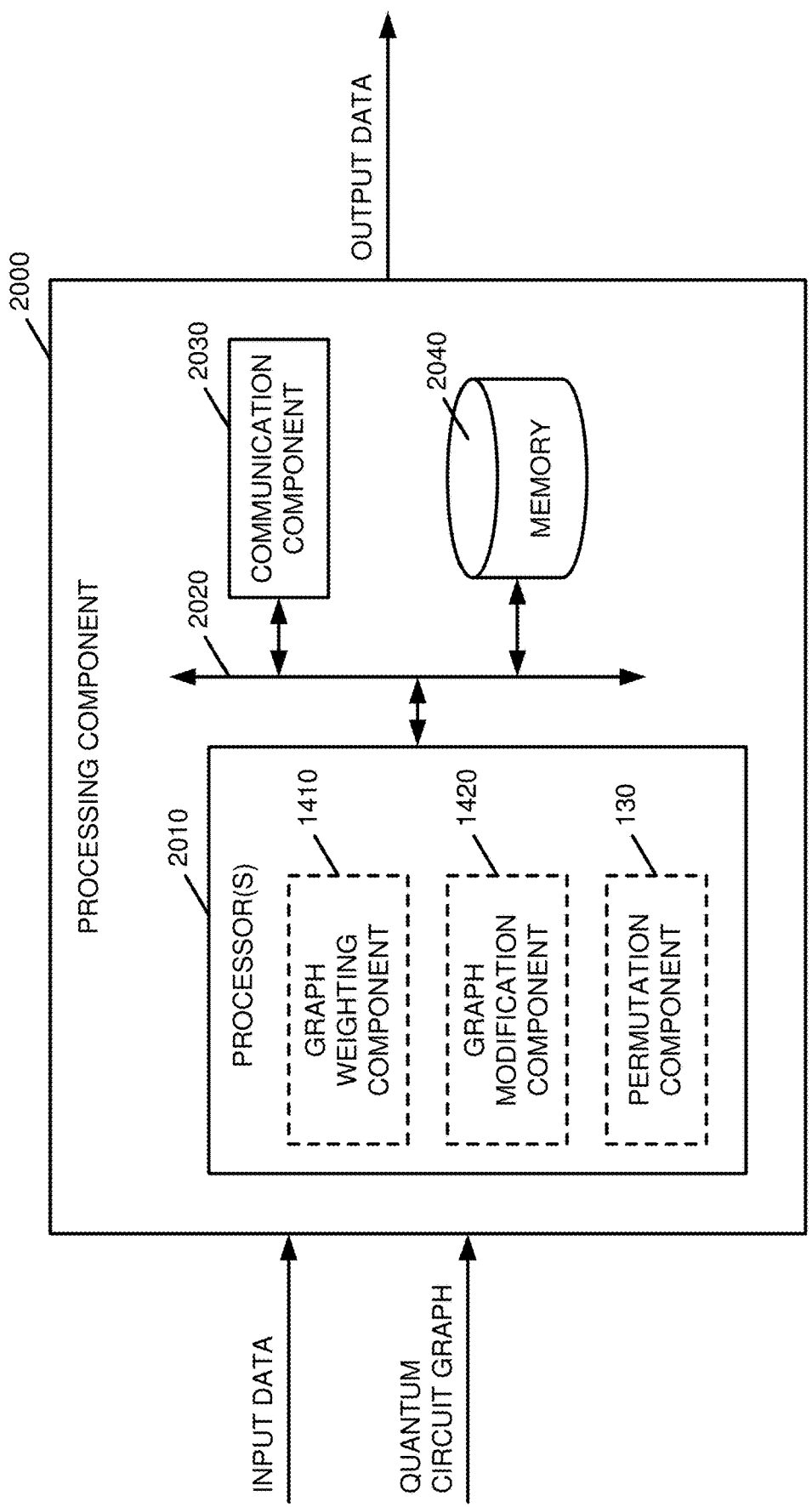

FIG. 20 illustrates another processing component 2000 that can be utilized to implement one or more aspects described herein in accordance with one or more embodiments. Repetitive description of like elements employed in other embodiments described herein is omitted for sake of brevity.

As shown in FIG. 20, the processing component 2000 can be associated with at least one processor 2010, which can be utilized to implement one or more of the graph weighting component 1410, graph modification component 1420, and/or permutation component 130 as described above. The processor(s) 2010 can be connected via a data bus 2020 to one or more additional sub-components of the processing component 2000, such as a communication component 2030 and/or a memory 2040. In an aspect, the communication component 2030 can be configured in a similar manner to the communication component 1930 described above with respect to FIG. 19.

Similar to the memory 1940 described above with respect to FIG. 19, the memory 2040 can be utilized by the processing component 2000 to store data utilized by the processing component 2000 in accordance with one or more embodiments described herein. Additionally or alternatively, the memory 2040 can have stored thereon machine-readable instructions that, when executed by the processing component 2000, cause the processing component (and/or one or more processors 2010 thereof) to implement the graph weighting component 1410, graph modification component 1420, and/or permutation component 130 as described above.

In various embodiments, the processing components 1900, 2000 shown in FIGS. 19-20 can be or include hardware, software (e.g., a set of threads, a set of processes, software in execution, etc.) or a combination of hardware and software that performs a computing task (e.g., a computing task associated with received data). For example, processing components 1900, 2000 can perform simulations of large and/or complex multi-qubit circuits and/or perform other operations that cannot be performed by a human (e.g., are greater than the capability of a human mind). For example, the amount of data processed, the speed of processing of the data and/or the data types processed by processing components 1900, 2000 over a certain period of time can be respectively greater, faster and different than the amount, speed and data type that can be processed by a single human mind over the same period of time. For example, data processed by processing components 1900, 2000 can be raw data (e.g., raw textual data, raw numerical data, etc.) and/or compressed data (e.g., compressed textual data, compressed numerical data, etc.) associated with one or more computing devices. Moreover, processing components 1900, 2000 can be fully operational towards performing one or more other functions (e.g., fully powered on, fully executed, etc.) while also processing the above-referenced data.

Figure 21:
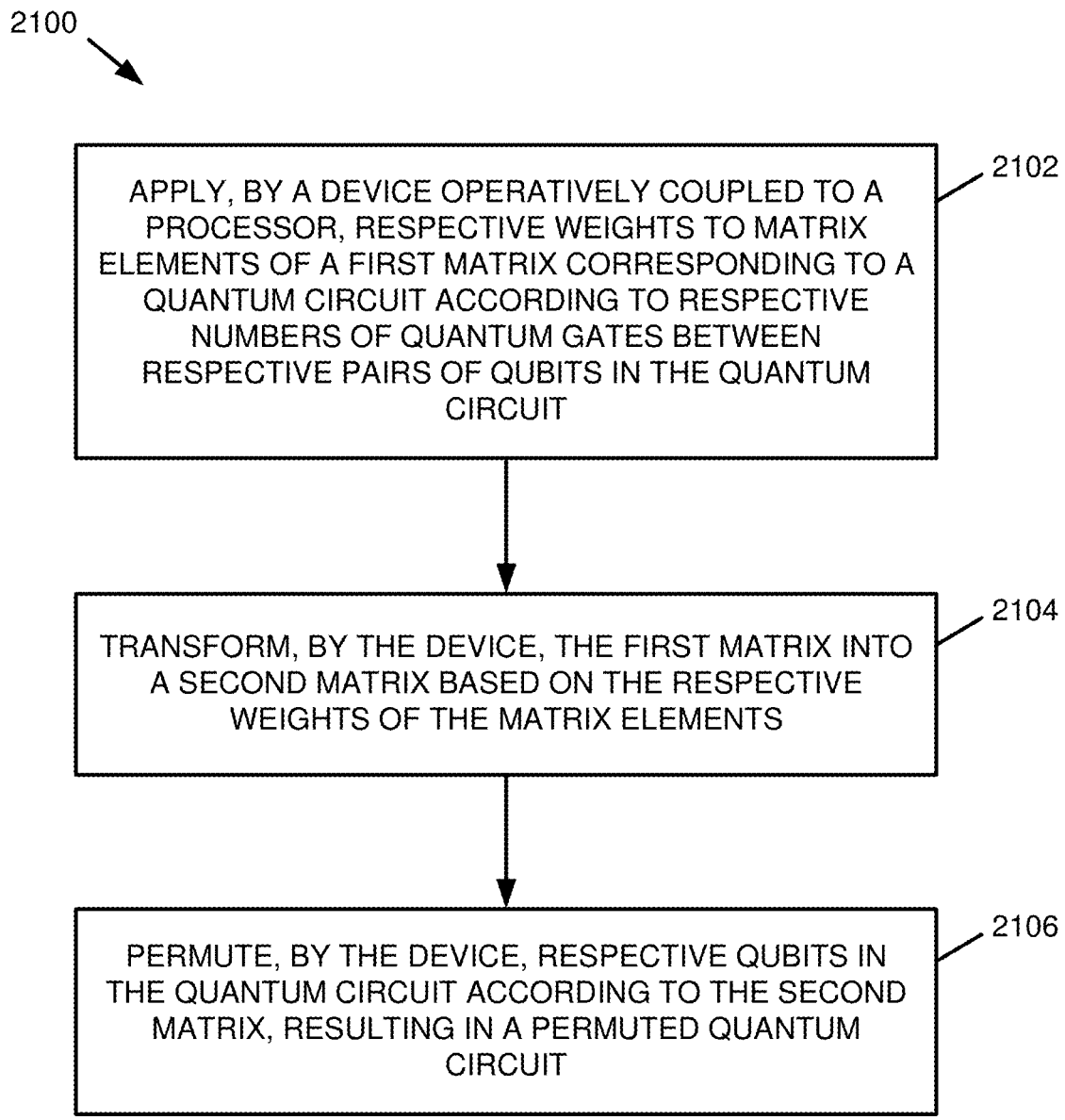
FIGS. 21-22 are flow diagrams of respective example, non-limiting computer-implemented methods that facilitate local optimization of quantum circuits according to one or more embodiments described herein.

FIG. 21 illustrates a flow diagram of an example, non-limiting computer-implemented method 2100 that facilitates local optimization of quantum circuits according to one or more embodiments described herein. Repetitive description of like elements employed in other embodiments described herein is omitted for sake of brevity.

At 2102, a device operatively coupled to a processor (e.g., processor(s) 1910 of a processing component 1900) can apply (e.g., by a matrix weighting component 110) respective weights to matrix elements of a first matrix corresponding to a quantum circuit. In an aspect, the weights can be applied according to respective numbers of quantum gates between respective pairs of qubits in the quantum circuit.

At 2104, the device can transform (e.g., by a bandwidth reduction component 120) the first matrix into a second matrix based on the respective weights of the matrix elements as applied at 2102.

At 2106, the device can permute (e.g., by a permutation component 130) respective qubits in the quantum circuit according to the second matrix generated at 2104, resulting in a permuted quantum circuit.

Figure 22:
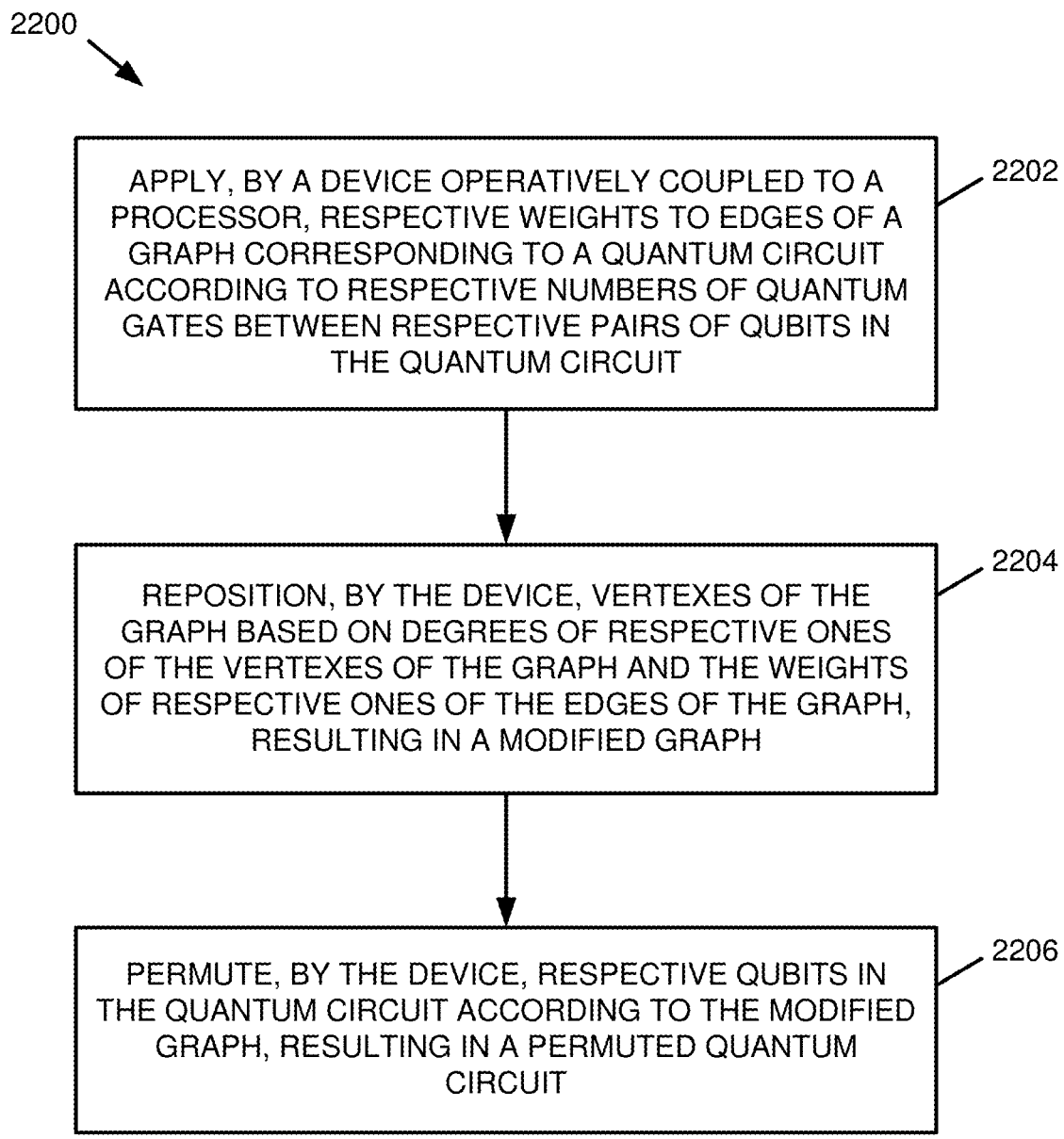

FIG. 22 illustrates a flow diagram of an alternative example, non-limiting computer-implemented method 2200 that facilitates local optimization of quantum circuits according to one or more embodiments described herein. Repetitive description of like elements employed in other embodiments described herein is omitted for sake of brevity.

At 2202, a device operatively coupled to a processor (e.g., processor(s) 2010 of a processing component 2000) can apply (e.g., by a graph weighting component 1410) respective weights to edges of a graph corresponding to a quantum circuit. In an aspect, the weights can be applied according to respective numbers of quantum gates between respective pairs of qubits in the quantum circuit.

At 2204, the device can reposition (e.g., by a graph modification component 1420) vertexes of the graph based on degrees of respective ones of the vertexes of the graph and the weights of respective ones of the edges of the graph as applied at 2202, resulting in a modified graph.

At 2206, the device can permute (e.g., by a permutation component 130) respective qubits in the quantum circuit according to the modified graph generated at 2204, resulting in a permuted quantum circuit.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies can alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components is established from a combination of electrical and mechanical components and circuitry, a human is unable to replicate or perform the subject data packet configuration and/or the subject communication between processing components. For example, a human is unable to generate data for transmission over a wired network and/or a wireless network between processing components, etc. Moreover, a human is unable to packetize data that can include a sequence of bits corresponding to information generated during one or more processes as described above, transmit data that can include a sequence of bits corresponding to information generated during one or more processes as described above, etc.

Figure 23:
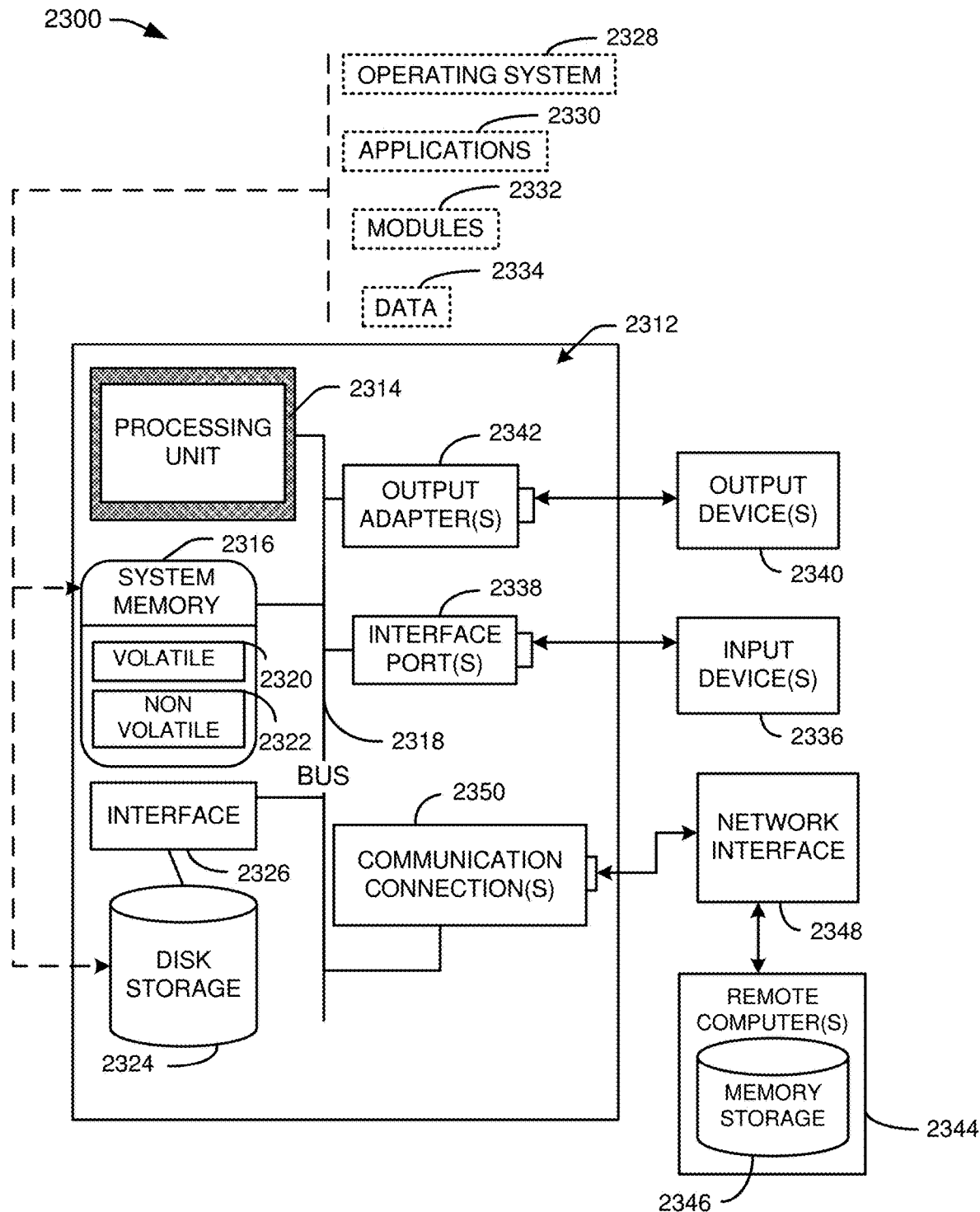
FIG. 23 is a block diagram of an example, non-limiting operating environment in which one or more embodiments described herein can be implemented.

In order to provide a context for the various aspects of the disclosed subject matter, FIG. 23 as well as the following discussion are intended to provide a general description of a suitable environment in which the various aspects of the disclosed subject matter can be implemented. FIG. 23 illustrates a block diagram of an example, non-limiting operating environment in which one or more embodiments described herein can be facilitated. Repetitive description of like elements employed in other embodiments described herein is omitted for sake of brevity. With reference to FIG. 23, a suitable operating environment 2300 for implementing various aspects of this disclosure can also include a computer 2312. The computer 2312 can also include a processing unit 2314, a system memory 2316, and a system bus 2318. The system bus 2318 couples system components including, but not limited to, the system memory 2316 to the processing unit 2314. The processing unit 2314 can be any of various available processors. Dual microprocessors and other multiprocessor architectures also can be employed as the processing unit 2314. The system bus 2318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 2316 can also include volatile memory 2320 and nonvolatile memory 2322. The basic input/output system (BIOS), containing the basic routines to transfer information between elements within the computer 2312, such as during start-up, is stored in nonvolatile memory 2322. By way of illustration, and not limitation, nonvolatile memory 2322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 2320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 2312 can also include removable/non-removable, volatile/non-volatile computer storage media. FIG. 23 illustrates, for example, a disk storage 2324. Disk storage 2324 can also include, but is not limited to, devices like a magnetic disk drive, solid state drive, floppy disk drive, tape drive, Jaz drive, Zip drive, LS-100 drive, flash memory card, or memory stick. The disk storage 2324 also can include storage media separately or in combination with other storage media including, but not limited to, an optical disk drive such as a compact disk ROM device (CD-ROM), CD recordable drive (CD-R Drive), CD rewritable drive (CD-RW Drive), a digital versatile disk ROM drive (DVD-ROM), or a Blu-ray disc drive. To facilitate connection of the disk storage 2324 to the system bus 2318, a removable or non-removable interface is typically used, such as interface 2326. FIG. 23 also depicts software that acts as an intermediary between users and the basic computer resources described in the suitable operating environment 2300. Such software can also include, for example, an operating system 2328. Operating system 2328, which can be stored on disk storage 2324, acts to control and allocate resources of the computer 2312. System applications 2330 take advantage of the management of resources by operating system 2328 through program modules 2332 and program data 2334, e.g., stored either in system memory 2316 or on disk storage 2324. It is to be appreciated that this disclosure can be implemented with various operating systems or combinations of operating systems. A user enters commands or information into the computer 2312 through input device (s) 2336. Input devices 2336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2314 through the system bus 2318 via interface port(s) 2338. Interface port(s) 2338 include, for example, a serial port, a parallel port, a game port, and a universal serial bus (USB). Output device (s) 2340 use some of the same type of ports as input device(s) 2336. Thus, for example, a USB port can be used to provide input to computer 2312, and to output information from computer 2312 to an output device 2340. Output adapter 2342 is provided to illustrate that there are some output devices 2340 like monitors, speakers, and printers, among other output devices 2340, which require special adapters. The output adapters 2342 include, by way of illustration and not limitation, video and sound cards that provide a means of connection between the output device 2340 and the system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. The remote computer(s) 2344 can be a computer, a server, a router, a network PC, a workstation, a microprocessor based appliance, a peer device or other common network node and the like, and typically can also include many or all of the elements described relative to computer 2312. For purposes of brevity, only a memory storage device 2346 is illustrated with remote computer(s) 2344. Remote computer(s) 2344 is logically connected to computer 2312 through a network interface 2348 and then physically connected via communication connection 2350. Network interface 2348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 2350 refers to the hardware/software employed to connect the network interface 2348 to the system bus 2318. While communication connection 2350 is shown for illustrative clarity inside computer 2312, it can also be external to computer 2312. The hardware/software for connection to the network interface 2348 can also include, for exemplary purposes only, internal and external technologies such as, modems including regular telephone grade modems, cable modems and DSL modems, ISDN adapters, and Ethernet cards.

Various embodiments of the present can be a system, a method, an apparatus and/or a computer program product at any possible technical detail level of integration. The computer program product can include a computer readable storage medium (or media) having computer readable program instructions thereon for causing a processor to carry out one or more aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform one or more aspects of the present invention.

One or more aspects of the present invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While portions of the subject matter have been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Various modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable components; and
   a processor that executes computer executable components stored in the memory, wherein the computer executable components comprise:
   a matrix weighting component that applies respective weights to matrix elements of a first matrix corresponding to a quantum circuit according to respective numbers of quantum gates between respective pairs of qubits in the quantum circuit;
   a bandwidth reduction component that transforms the first matrix into a second matrix based on the respective weights of the matrix elements; and
   a permutation component that permutes respective qubits in the quantum circuit according to the second matrix, resulting in a permuted quantum circuit, wherein the bandwidth reduction component comprises a search component that generates an ordered list of qubits based on the respective weights of the matrix elements, and wherein the bandwidth reduction component transforms the first matrix into the second matrix based on the ordered list of qubits.

2. The system of claim 1, wherein the search component selects, as a first qubit in the ordered list of qubits, a qubit in the quantum circuit having a first number of inter-qubit connections and a first combined matrix element weighting.

3. The system of claim 2, wherein the search component stores qubits to the ordered list of qubits by increasing number of inter-qubit connections and decreasing combined matrix element weighting from the first number of inter-qubit connections and the first combined matrix element weighting, respectively.

4. The system of claim 1, wherein the bandwidth reduction component reverses the ordered list of qubits, resulting in a reversed ordered list of qubits, and transforms the first matrix into the second matrix based on the reversed ordered list of qubits.

5. The system of claim 1, wherein the bandwidth reduction component transforms the first matrix into the second matrix via a breadth-first search.

6. The system of claim 1, further comprising:
a SWAP mapping component that maps SWAP gates to respective qubits of the permuted quantum circuit.

7. The system of claim 1, wherein the first matrix has a first bandwidth, and wherein the second matrix has a second bandwidth that is less than the first bandwidth.

8. A computer-implemented method comprising:
applying, by a device operatively coupled to a processor, respective weights to matrix elements of a first matrix corresponding to a quantum circuit according to respective numbers of quantum gates between respective pairs of qubits in the quantum circuit;
transforming, by the device, the first matrix into a second matrix based on the respective weights of the matrix elements; and
permuting, by the device, respective qubits in the quantum circuit according to the second matrix, resulting in a permuted quantum circuit, wherein the transforming comprises:
generating an ordered list of qubits based on the respective weights of the matrix elements; and
transforming the first matrix into the second matrix based on the ordered list of qubits.

9. The computer-implemented method of claim 8, wherein the generating comprises:
selecting, as a first qubit in the ordered list of qubits, a qubit in the quantum circuit having a first number of inter-qubit connections and a first combined matrix element weighting; and
storing qubits to the ordered list of qubits by increasing number of inter-qubit connections and decreasing combined matrix element weighting from the first number of inter-qubit connections and the first combined matrix element weighting, respectively.

10. The computer-implemented method of claim 8, wherein the transforming further comprises:
reversing the ordered list of qubits, resulting in a reversed ordered list of qubits; and
transforming the first matrix into the second matrix based on the reversed ordered list of qubits.

11. The computer-implemented method of claim 8, wherein the generating comprises:
transforming the first matrix into the second matrix via a breadth-first search.

12. A computer program product for local optimization of a quantum circuit, the computer program product comprising a computer readable storage medium having program instructions embodied therewith, the program instructions executable by a processor to cause the processor to:
apply respective weights to matrix elements of a first matrix corresponding to a quantum circuit according to respective numbers of quantum gates between respective pairs of qubits in the quantum circuit;
transform the first matrix into a second matrix based on the respective weights of the matrix elements;
permute respective qubits in the quantum circuit according to the second matrix, resulting in a permuted quantum circuit;
generate an ordered list of qubits based on the respective weights of the matrix elements; and
transform the first matrix into the second matrix based on the ordered list of qubits.

13. The computer program product of claim 12, wherein the program instructions further cause the processor to:
transform the first matrix into the second matrix via a breadth-first search.

14. A system comprising:
a memory that stores computer executable components; and
a processor that executes computer executable components stored in the memory, wherein the computer executable components comprise:
a graph weighting component that applies respective weights to edges of a graph corresponding to a quantum circuit according to respective numbers of quantum gates between respective pairs of qubits in the quantum circuit;
a graph modification component that repositions vertexes of the graph based on degrees of respective ones of the vertexes in the graph and the weights of respective ones of the edges of the graph, resulting in a modified graph; and
a permutation component that permutes respective qubits in the quantum circuit according to the modified graph, resulting in a permuted quantum circuit, wherein the graph modification component comprises a search component that generates an ordered list of qubits based on the degrees of the respective ones of the vertexes of the graph and the weights of the respective ones of the edges of the graph, and wherein the graph modification component repositions the vertexes of the graph based on the ordered list of qubits.

15. The system of claim 14, wherein the search component selects, as a first qubit in the ordered list of qubits, a qubit corresponding to a vertex of the graph having a first degree and a first combined edge weight and stores qubits to the ordered list of qubits by increasing degree and decreasing combined edge weight from the first degree and the first combined edge weight, respectively.

16. The system of claim 14, wherein the graph modification component reverses the ordered list of qubits, resulting in a reversed ordered list of qubits, and repositions the vertexes of the graph based on the reversed ordered list of qubits.

17. The system of claim 14, wherein the graph modification component repositions the vertexes of the graph via a breadth-first search.

18. A computer-implemented method comprising:
applying, by a device operatively coupled to a processor, respective weights to edges of a graph corresponding to a quantum circuit according to respective numbers of quantum gates between respective pairs of qubits in the quantum circuit;
repositioning, by the device, vertexes of the graph based on degrees of respective ones of the vertexes of the graph and the weights of respective ones of the edges of the graph, resulting in a modified graph; and permuting, by the device, respective qubits in the quantum circuit according to the modified graph, resulting in a permuted quantum circuit, wherein the repositioning comprises:

generating an ordered list of qubits based on the degrees of the respective ones of the vertexes of the graph and the weights of the respective ones of the edges of the graph; and repositioning the vertexes of the graph based on the ordered list of qubits.

19. The computer-implemented method of claim 18, wherein the repositioning further comprises:

selecting, as a first qubit in the ordered list of qubits, a qubit corresponding to a vertex of the graph having a first degree and a first combined edge weight; and storing qubits to the ordered list of qubits by increasing degree and decreasing combined edge weight from the first degree and the first combined edge weight, respectively.

20. The computer-implemented method of claim 18, wherein the repositioning comprises:

repositioning the vertexes of the graph via a breadth-first search.

* * * * *